(12) United States Patent
Jinnai et al.

(10) Patent No.: US 10,378,615 B2
(45) Date of Patent: Aug. 13, 2019

(54) CLUTCH AND SPEED CHANGE DEVICE INCLUDING THE SAME

(71) Applicant: AISIN AW CO., LTD., Anjo-shi, Aichi-ken (JP)

(72) Inventors: Naoya Jinnai, Okazaki (JP); Masahiro Otake, Nishio (JP); Shota Ikeda, Anjo (JP); Minoru Todo, Takahama (JP); Takuya Nakajima, Toyota (JP)

(73) Assignee: AISIN AW CO., LTD., Anjo (JP)

( * ) Notice: Subject to any disclaimer, the term of this patent is extended or adjusted under 35 U.S.C. 154(b) by 161 days.

(21) Appl. No.: 15/529,751

(22) PCT Filed: Nov. 30, 2015

(86) PCT No.: PCT/JP2015/083666
§ 371 (c)(1),
(2) Date: May 25, 2017

(87) PCT Pub. No.: WO2016/104063
PCT Pub. Date: Jun. 30, 2016

(65) Prior Publication Data
US 2017/0314650 A1    Nov. 2, 2017

(30) Foreign Application Priority Data

Dec. 26, 2014 (JP) ................................. 2014-265299

(51) Int. Cl.
*F16H 3/66* (2006.01)
*F16D 25/0638* (2006.01)
(Continued)

(52) U.S. Cl.
CPC ............ *F16H 3/663* (2013.01); *F16D 1/101* (2013.01); *F16D 13/646* (2013.01); *F16D 13/76* (2013.01);
(Continued)

(58) Field of Classification Search
CPC ............ F16D 25/0638; F16D 25/0635; F16D 13/646; F16D 13/644; F16D 13/76; F16H 3/663; F16H 3/66; F16H 2057/087
See application file for complete search history.

(56) References Cited

U.S. PATENT DOCUMENTS

| | | | |
|---|---|---|---|
| 2010/0216591 A1 | 8/2010 | Wittkopp et al. | |
| 2012/0316025 A1 | 12/2012 | Oguri et al. | |
| 2015/0267787 A1 | 9/2015 | Hart | |

FOREIGN PATENT DOCUMENTS

| | | |
|---|---|---|
| JP | 2003-106387 A | 4/2003 |
| JP | 2004-251310 A | 9/2004 |

(Continued)

OTHER PUBLICATIONS

Feb. 16, 2016 International Search Report issued with International Patent Application No. PCT/JP2015/083666.

*Primary Examiner* — Erin D Bishop
(74) *Attorney, Agent, or Firm* — Oliff PLC

(57) ABSTRACT

A clutch that includes a friction plate; a separator plate; a clutch hub; and a piston that presses the friction plate and the separator plate, wherein the clutch hub includes a hub on which an inner peripheral portion of the friction plate or the separator plate is fitted, a tubular shaft that movably supports the piston, and an engagement oil chamber defining wall that together with the piston defines an engagement oil chamber to which an engagement oil pressure is supplied, the hub is spline-fitted on a gear of a planetary gear so as to rotate with the gear, and the tubular shaft is rotatably supported by a central shaft and is fitted by a spigot joint in the gear.

20 Claims, 9 Drawing Sheets

(51) Int. Cl.
*F16D 1/10* (2006.01)
*F16D 13/64* (2006.01)
*F16D 21/06* (2006.01)
*F16D 25/10* (2006.01)
*F16H 45/02* (2006.01)
*F16D 13/76* (2006.01)
*F16H 57/10* (2006.01)
*F16D 13/74* (2006.01)
*F16D 25/12* (2006.01)
*F16H 57/08* (2006.01)

(52) U.S. Cl.
CPC ......... *F16D 21/06* (2013.01); *F16D 25/0638* (2013.01); *F16D 25/10* (2013.01); *F16H 45/02* (2013.01); *F16H 57/10* (2013.01); *F16D 13/74* (2013.01); *F16D 25/123* (2013.01); *F16D 2001/103* (2013.01); *F16D 2021/0661* (2013.01); *F16H 2045/0221* (2013.01); *F16H 2045/0284* (2013.01); *F16H 2057/087* (2013.01); *F16H 2200/0069* (2013.01); *F16H 2200/201* (2013.01); *F16H 2200/2012* (2013.01); *F16H 2200/2023* (2013.01); *F16H 2200/2046* (2013.01)

(56) References Cited

FOREIGN PATENT DOCUMENTS

| | | |
|---|---|---|
| JP | 2008-291947 A | 12/2008 |
| JP | 2011-112172 A | 6/2011 |
| JP | 2012-202438 A | 10/2012 |
| JP | 2012-251647 A | 12/2012 |
| JP | 2015-105723 A | 6/2015 |
| JP | 2015-183855 A | 10/2015 |

FIG. 2

|      | C1 | C2 | C3 | C4 | B1 | B2 |
|------|----|----|----|----|----|----|
| 1st  | O  | O  | –  | –  | –  | O  |
| 2nd  | O  | –  | –  | –  | O  | O  |
| 3rd  | –  | O  | –  | –  | O  | O  |
| 4th  | –  | –  | –  | O  | O  | O  |
| 5th  | –  | O  | –  | O  | O  | –  |
| 6th  | O  | –  | –  | O  | O  | –  |
| 7th  | O  | –  | O  | O  | –  | –  |
| 8th  | –  | –  | O  | O  | O  | –  |
| 9th  | O  | –  | O  | –  | O  | –  |
| 10th | –  | O  | O  | –  | O  | –  |
| REV. | –  | O  | O  | –  | –  | O  |

※ "O": ENGAGED, "–": RELEASED

CLUTCH AND SPEED CHANGE DEVICE INCLUDING THE SAME

BACKGROUND

The present disclosure relates to clutches including friction plates, separator plates, a clutch hub, and a piston, and speed change devices including the same.

Conventionally, a clutch including a clutch hub having a tubular portion on which the inner peripheral portions of a plurality of separator plates are fitted and an annular coupling portion extended radially inward from the tubular portion is known as this type of clutch (see, e.g., Japanese Patent Application Publication No. 2015-105723). In this clutch, the inner peripheral portion of the coupling portion of the clutch hub is constantly coupled (fixed) via splines to a shaft portion extended in the axial direction from a sun gear of a planetary gear forming a speed change device. An oil chamber defining member that together with a piston defines an engagement oil chamber is fixed to the shaft portion of the sun gear by using a snap ring. The piston is supported by the shaft portion so that the piston rotates with the shaft portion of the sun gear and can move in the axial direction. The piston together with the clutch hub and the shaft portion defines a centrifugal oil pressure cancel chamber in which a centrifugal oil pressure generated in the engagement oil chamber is canceled. The sun gear that is an element to be connected by the clutch rotates at a relatively high speed when the speed change device is in operation. By defining all the oil chambers of the clutch, namely the engagement oil chamber and the centrifugal oil pressure cancel chamber, by the shaft portion, the piston, and the oil chamber defining member that rotate with the sun gear, hydraulic oil is restrained from flowing out of the centrifugal oil pressure cancel chamber once supplied, and shift performance of the speed change device can be improved.

SUMMARY

However, in the case where the relatively long shaft portion is extended from the sun gear of the planetary gear as in the conventional clutch, machining accuracy of gear teeth of the sun gear may not be satisfactorily ensured. In order to ensure the machining accuracy of the gear teeth of the sun gear, the sun gear and the shaft portion may be separated and may be coupled together via splines. However, support accuracy of the sun gear may be reduced in this case.

An exemplary aspect of the present disclosure satisfactorily ensures machining accuracy and support accuracy of a gear of a planetary gear in a clutch including a clutch hub that rotates with the gear.

A clutch of the present disclosure includes a friction plate; a separator plate; a clutch hub; and a piston that presses the friction plate and the separator plate, wherein the clutch hub includes a hub on which an inner peripheral portion of the friction plate or the separator plate is fitted, a tubular shaft that movably supports the piston, and an engagement oil chamber defining wall that together with the piston defines an engagement oil chamber to which an engagement oil pressure is supplied, the hub is spline-fitted on a gear of a planetary gear so as to rotate with the gear, and the tubular shaft is rotatably supported by a central shaft and is fitted by a spigot joint in the gear.

The clutch hub of this clutch includes the hub on which the friction plate or the separator plate is fitted, the tubular shaft that movably supports the piston, and the engagement oil chamber defining wall that together with the piston defines the engagement oil chamber to which an engagement oil pressure is supplied. The hub is spline-fitted on the gear of the planetary gear so as to rotate with the gear, and the tubular shaft is rotatably supported by the central shaft and is fitted by spigot joint in the gear. Since the hub of the clutch hub is a separate member from the gear of the planetary gear and is spline-fitted on the gear, machining accuracy of the gear of the planetary gear can be satisfactorily ensured, and the hub of the clutch hub and the gear of the planetary gear can be made to rotate together. Since the shaft portion of the clutch hub which is rotatably supported by the central shaft is fitted by spigot joint in the gear of the planetary gear, the gear can be accurately supported (aligned) by the shaft portion. As a result, in the clutch including the clutch hub that rotates with the gear of the planetary gear, machining accuracy and support accuracy of the gear can be satisfactorily ensured.

BRIEF DESCRIPTION OF THE DRAWINGS

FIG. 2 is an operation table showing the relationship between each shift speed and the operating state of clutches and brakes in the speed change device of FIG. 1.

DETAILED DESCRIPTION OF EMBODIMENTS

Modes for carrying out the disclosure of the present disclosure will be described with reference to the accompanying drawings.

Figure 1:
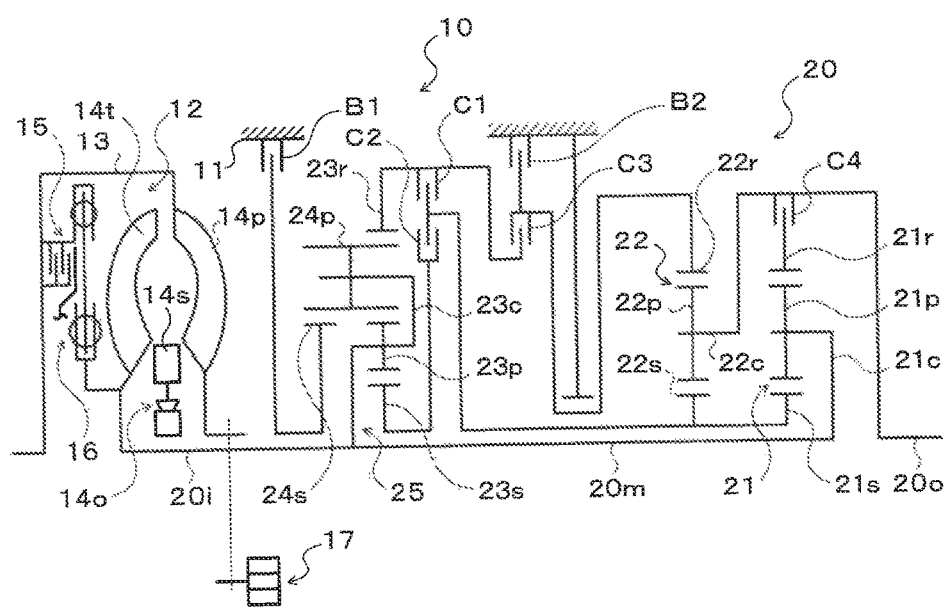
FIG. 1 is a schematic configuration diagram of a power transmission device including a speed change device of the present disclosure.

FIG. 1 is a schematic configuration diagram of a power transmission device 10 including an automatic transmission 20 serving as a speed change device according to an embodiment of the present disclosure. The power transmission device 10 shown in FIG. 1 is connected to a crankshaft of an engine (internal combustion engine) and/or a rotor of an electric motor, not shown, which serves as a driving source mounted longitudinally in the front part of a rear wheel drive vehicle, and can transmit power (torque) from the engine etc. to right and left rear wheels (driving wheels), not shown. As shown in the figure, the power transmission device 10 includes a transmission case (stationary member) 11, a starting device (hydraulic transmission device) 12, an oil pump 17, etc. in addition to the automatic transmission 20 that shifts power transmitted from the engine etc. to an input shaft (input member/input) 20$i$ to transmit the shifted power to an output shaft (output member/output) 20$o$.

The starting device 12 includes a front cover 13 that is coupled to the crankshaft of the engine and/or the rotor of the electric motor via a drive plate, not shown, etc. and a torque converter having: an input-side pump impeller 14$p$ having a pump shell that is firmly fixed to the front cover 13; an output-side turbine runner 14$t$ that is coupled to the input shaft 20$i$ of the automatic transmission 20; a stator 14$s$ that is placed inside the pump impeller 14$p$ and the turbine runner 14$t$ to adjust the flow of hydraulic oil from the turbine runner 14$t$ to the pump impeller 14$p$; a one-way clutch 14$o$ that is supported by a stator shaft, not shown, and that allows the stator 14$s$ to rotate only in one direction, etc.

The starting device 12 further includes a lockup clutch 15 that connects and disconnects the front cover 13 coupled to the crankshaft of the engine etc. to and from the input shaft 20$i$ of the automatic transmission 20, and a damper mechanism 16 that is disposed between the front cover 13 and the input shaft 20$i$ of the automatic transmission 20 to damp vibration. In the present embodiment, the lockup clutch 15 is a multi-plate friction hydraulic clutch having a plurality of friction engagement plates (friction plates and separator plates). However, the lockup clutch 15 may be a single-plate friction hydraulic clutch. The starting device 12 may include a fluid coupling that does not have the stator 14$s$.

The oil pump 17 is configured as a gear pump that has a pump assembly including a pump body and a pump cover, an external gear (inner rotor) coupled to the pump impeller 14$p$ of the starting device 12 via a chain or a gear train, an internal gear (outer rotor) meshing with the external gear, etc. The oil pump 17 is driven by power from the engine and sucks hydraulic oil (ATF) stored in an oil pan, not shown, to pressure-feed the sucked hydraulic oil to a hydraulic control device, not shown.

The automatic transmission 20 is configured as a 10-speed transmission. As shown in FIG. 1, the automatic transmission 20 includes, in addition to the input shaft 20$i$ and the output shaft 20$o$ coupled to the right and left rear wheels via a differential gear and drive shafts, not shown, a single-pinion type first planetary gear 21 and a single-pinion type second planetary gear 22 which are arranged side by side in the axial direction of the automatic transmission 20 (the input shaft 20$i$ and the output shaft 20$o$), and a Ravigneaux type planetary gear mechanism 25 serving as a compound planetary gear train formed by combination of a double-pinion type planetary gear and a single-pinion type planetary gear. The automatic transmission 20 further includes a clutch C1 (first clutch) serving as a first engagement element, a clutch C2 (second clutch) serving as a second engagement element, a clutch C3 (third clutch) serving as a third engagement element, a clutch C4 (fourth clutch) serving as a fourth engagement element, a brake B1 (first brake) serving as a fifth engagement element, and a brake B2 (second brake) serving as a sixth engagement element, which change a power transmission path from the input shaft 20$i$ to the output shaft 20$o$.

In the present embodiment, the first and second planetary gears 21, 22 and the Ravigneaux type planetary gear mechanism 25 are arranged side by side in the transmission case 11 in order of the Ravigneaux type planetary gear mechanism 25, the second planetary gear 22, and the first planetary gear 21, namely in order of the single-pinion type planetary gear of the Ravigneaux type planetary gear mechanism 25, the double-pinion type planetary gear of the Ravigneaux type planetary gear mechanism 25, the second planetary gear 22, and the first planetary gear 21, from the starting device 12 side, i.e., from the engine side (the left side in FIG. 1). Accordingly, the Ravigneaux type planetary gear mechanism 25 is disposed on the front side of the vehicle so as to be located near the starting device 12. The first planetary gear 21 is disposed on the rear side of the vehicle so as to be located near the output shaft 20$o$. The second planetary gear 22 is disposed between the Ravigneaux type planetary gear mechanism 25 and the first planetary gear 21 in the axial direction of the input shaft 20$i$, the output shaft 20$o$, etc.

The first planetary gear 21 has a first sun gear 21$s$ that is an external gear, a first ring gear 21$r$ that is an internal gear placed concentrically with the first sun gear 21$s$, a plurality of first pinion gears 21$p$ each meshing with the first sun gear 21$s$ and the first ring gear 21$r$, and a first carrier 21$c$ holding the plurality of first pinion gears 21$p$ so that the plurality of first pinion gears 21$p$ can rotate (turn) and revolve. In the present embodiment, the gear ratio $\lambda 1$ of the first planetary gear 21 (the number of teeth of the first sun gear 21$s$/the number of teeth of the first ring gear 21$r$) is set to, e.g., $\lambda 1=0.277$.

As shown in FIG. 1, the first carrier 21$c$ of the first planetary gear 21 is constantly coupled (fixed) to an intermediate shaft 20$m$ of the automatic transmission 20 which is coupled to the input shaft 20$i$. Accordingly, when power is being transmitted from the engine to the input shaft 20$i$, the power from the engine is constantly transmitted to the first carrier 21$c$ via the input shaft 20$i$ and the intermediate shaft 20$m$. The first carrier 21$c$ functions as an input element of the first planetary gear 21 when the clutch C4 is in an engaged state. The first carrier 21$c$ idles when the clutch C4 is in a disengaged state. The first ring gear 21$r$ functions as an output element of the first planetary gear 21 when the clutch C4 is in an engaged state.

The second planetary gear 22 has a second sun gear 22$s$ that is an external gear, a second ring gear 22$r$ that is an internal gear placed concentrically with the second sun gear 22$s$, a plurality of second pinion gears 22$p$ each meshing with the second sun gear 22$s$ and the second ring gear 22$r$, and a second carrier (planetary carrier) 22$c$ holding the plurality of second pinion gears 22$p$ so that the plurality of second pinion gears 22$p$ can rotate (turn) and revolve. In the present embodiment, the gear ratio $\lambda 2$ of the second planetary gear 22 (the number of teeth of the second sun gear 22$s$/the number of teeth of the second ring gear 22$r$) is set to, e.g., $\lambda 2=0.244$.

As shown in FIG. 1, the second sun gear 22$s$ of the second planetary gear 22 is fixedly coupled to (constantly coupled to) the first sun gear 21$s$ of the first planetary gear 21 and always rotates or stops with (and coaxially with) the first sun gear 21$s$. However, the first sun gear 21$s$ and the second sun gear 22$s$ may be formed as separate members and may be constantly coupled together via a coupling member (first coupling member), not shown. The second carrier 22$c$ of the second planetary gear 22 is constantly coupled to the output shaft 20$o$ and always rotates or stops with (and coaxially with) the output shaft 20$o$. Accordingly, the second carrier 22$c$ functions as an output element of the second planetary gear 22. The second ring gear 22$r$ of the second planetary gear 22 functions as a fixable element of the second planetary gear 22.

The Ravigneaux type planetary gear mechanism 25 has a third sun gear 23$s$ and a fourth sun gear 24$s$ which are external gears, a third ring gear 23$r$ that is an internal gear placed concentrically with the third sun gear 23$s$, a plurality of third pinion gears (short pinion gears) 23$p$ meshing with the third sun gear 23$s$, a plurality of fourth pinion gears (long pinion gears) 24$p$ meshing with the fourth sun gear 24$s$ and the plurality of third pinion gears 23$p$ and meshing with the third ring gear 23$r$, and a third carrier 23$c$ holding the plurality of third pinion gears 23$p$ and the plurality of fourth pinion gears 24$p$ so that the plurality of third pinion gears 23$p$ and the plurality of fourth pinion gears 24$p$ can rotate (turn) and revolve.

Such a Ravigneaux type planetary gear mechanism 25 is a compound planetary gear train formed by combination of a double-pinion type planetary gear (third planetary gear) and a single-pinion type planetary gear (fourth planetary gear). That is, the third sun gear 23$s$, the third carrier 23$c$, the third and fourth pinion gears 23$p$, 24$p$, and the third ring gear 23$r$ of the Ravigneaux type planetary gear mechanism 25 form the double-pinion type third planetary gear. The fourth sun gear 24$s$, the third carrier 23$c$, the fourth pinion gears 24$p$, and the third ring gear 23$r$ of the Ravigneaux type planetary gear mechanism 25 form the single-pinion type fourth planetary gear. In the present embodiment, the Ravigneaux type planetary gear mechanism 25 is configured so that the gear ratio $\lambda 3$ of the double-pinion type third planetary gear (the number of teeth of the third sun gear 23$s$/the number of teeth of the third ring gear 23$r$) is, e.g., $\lambda 3=0.488$ and the gear ratio $\lambda 4$ of the single-pinion type fourth planetary gear (the number of teeth of the fourth sun gear 24$s$/the number of teeth of the third ring gear 23$r$) is, e.g., $\lambda 4=0.581$.

Of the rotary elements of the Ravigneaux type planetary gear mechanism 25 (the third and fourth planetary gears), the fourth sun gear 24$s$ functions as a fixable element of the Ravigneaux type planetary gear mechanism 25 (second fixable element of the automatic transmission 20). As shown in FIG. 1, the third carrier 23$c$ is constantly coupled (fixed) to the input shaft 20$i$ and is constantly coupled to the first carrier 21$c$ of the first planetary gear 21 via the intermediate shaft 20$m$ serving as a coupling member (second coupling member). Accordingly, when power is being transmitted from the engine to the input shaft 20$i$, the power from the engine is constantly transmitted to the third carrier 23$c$ via the input shaft 20$i$. The third carrier 23$c$ thus functions as an input element of the Ravigneaux type planetary gear mechanism 25. The third ring gear 23$r$ functions as a first output element of the Ravigneaux type planetary gear mechanism 25, and the third sun gear 23$s$ functions as a second output element of the Ravigneaux type planetary gear mechanism 25.

The clutch C1 connects and disconnects the first sun gear 21$s$ of the first planetary gear 21 and the second sun gear 22$s$ of the second planetary gear 22, which are constantly coupled together, to and from the third ring gear 23$r$ serving as the first output element of the Ravigneaux type planetary gear mechanism 25. The clutch C2 connects and disconnects the first sun gear 21$s$ of the first planetary gear 21 and the second sun gear 22$s$ of the second planetary gear 22, which are constantly coupled together, to and from the third sun gear 23$s$ serving as the second output element of the Ravigneaux type planetary gear mechanism 25. The clutch C3 connects and disconnects the second ring gear 22$r$ of the second planetary gear 22 to and from the third ring gear 23$r$ serving as the first output element of the Ravigneaux type planetary gear mechanism 25. The clutch C4 connects and disconnects the first ring gear 21$r$ serving as the output element of the first planetary gear 21 to and from the output shaft 20$o$.

The brake B1 holds (connects) the fourth sun gear 24$s$ serving as the fixable element of the Ravigneaux type planetary gear mechanism 25 stationary to the transmission case 11 serving as the stationary member, and disconnects the fourth sun gear 24$s$ from the transmission case 11 so as to allow the fourth sun gear 24$s$ to rotate relative to the transmission case 11. The brake B2 holds (connects) the second ring gear 22$r$ serving as the fixable element of the second planetary gear 22 stationary to the transmission case 11, and disconnects the second ring gear 22$r$ from the transmission case 11 serving as the stationary member so as to allow the second ring gear 22$r$ to rotate relative to the transmission case 11.

In the present embodiment, multi-plate friction hydraulic clutches (friction engagement elements) each having a hydraulic servo formed by a piston, a plurality of friction engagement plates (friction plates and separator plates), an engagement oil chamber and a centrifugal oil pressure cancel chamber to which hydraulic oil is supplied, etc. are used as the clutches C1 to C4. Multi-plate friction hydraulic brakes each having a hydraulic servo formed by a piston, a plurality of friction engagement plates (friction plates and separator plates), an engagement oil chamber to which hydraulic oil is supplied, etc. are used as the brakes B1, B2. The clutches C1 to C4 and the brakes B1, B2 operate according to supply and discharge of hydraulic oil by the hydraulic control device.

Figure 3:
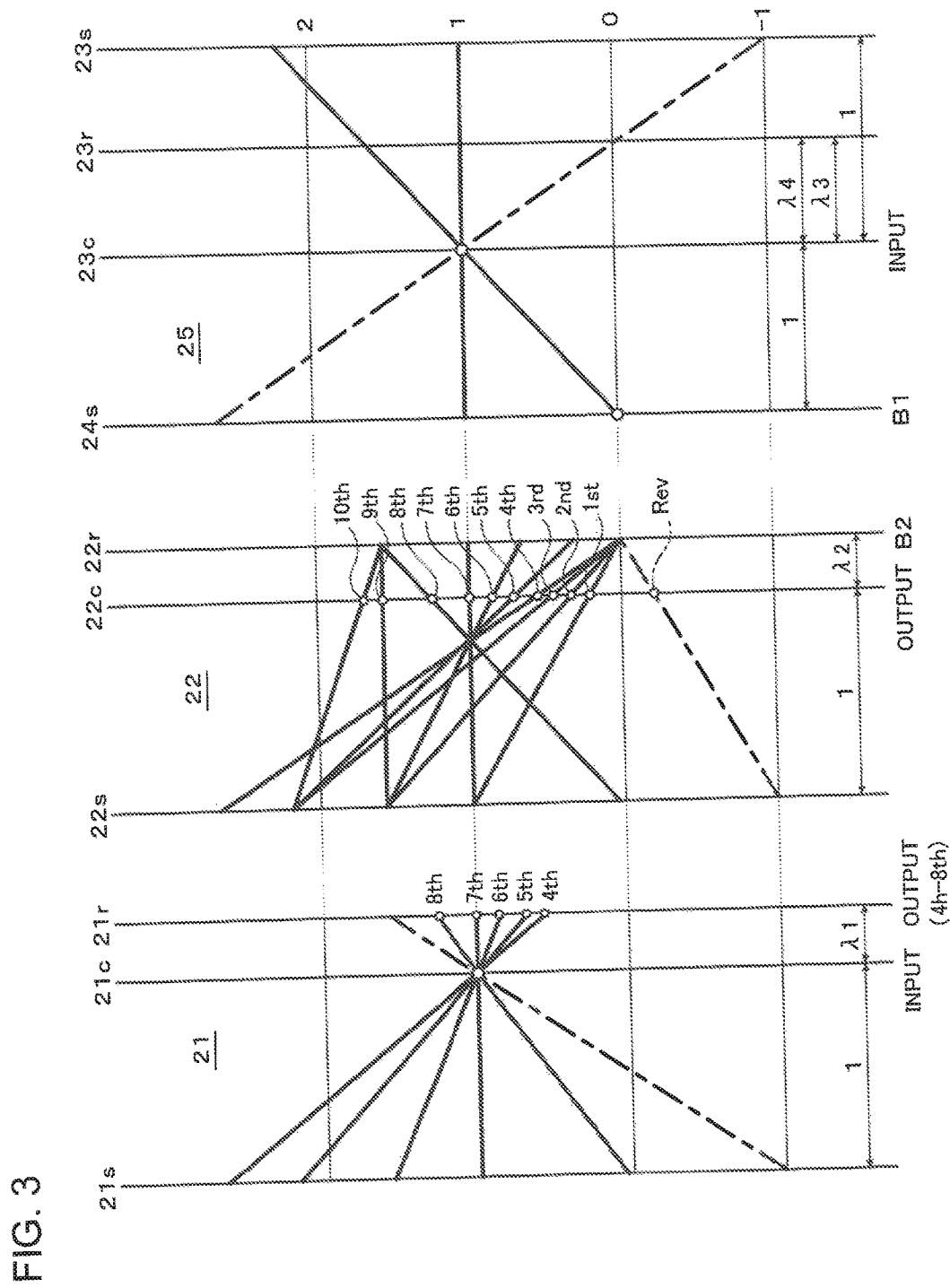
FIG. 3 is a speed diagram showing the ratio of the rotational speed of each rotary element to the input rotational speed in the speed change device of FIG. 1.

FIG. 2 is an operation table showing the relationship between each shift speed of the automatic transmission 20 and the operating state of the clutches C1 to C4 and the brakes B1, B2. FIG. 3 is a speed diagram showing the ratio of the rotational speed of each rotary element to the rotational speed of the input shaft 20$i$ (input rotational speed) in the automatic transmission 20. The automatic transmission 20 provides forward speeds from a first speed to a tenth speed and a reverse speed by creating the states of the clutches C1 to C4 and the brakes B1, B2 as shown in the operation table of FIG. 2.

The ten rotary elements of the first and second planetary gears 21, 22 and the Ravigneaux type planetary gear mechanism 25 (substantially a total of nine rotary elements as the first sun gear 21$s$ and the second sun gear 22$s$ are constantly coupled together) are arranged at intervals corresponding to the gear ratios $\lambda 1$, $\lambda 2$, $\lambda 3$, $\lambda 4$ in order shown in the figure from the left in FIG. 3. According to the order of arrangement in the speed diagram, in the present embodiment, the first sun gear 21$s$ is a first rotary element of the automatic transmission 20, the first carrier 21$c$ is a second rotary element of the automatic transmission 20, and the first ring gear 21$r$ is a third rotary element of the automatic transmission 20. The second sun gear 22$s$ is a fourth rotary element of the automatic transmission 20, the second carrier 22$c$ is a fifth rotary element of the automatic transmission 20, and the second ring gear 22$r$ is a fourth rotary element of the automatic transmission 20. The fourth sun gear 24$s$ is a seventh rotary element of the automatic transmission 20, the third carrier 23$c$ is an eighth rotary element of the automatic transmission 20, the third ring gear 23$r$ is a ninth rotary element of the automatic transmission 20, and the third sun gear 23$s$ is a tenth rotary element of the automatic transmission 20.

The gear ratios $\lambda 1$ to $\lambda 4$ of the first and second planetary gears 21, 22 and the third and fourth planetary gears are not limited to the above gear ratios. In the automatic transmission 20, at least one of the clutches C1 to C4 and the brake B1, B2 may be a meshing engagement element such as a dog clutch or a dog brake. For example, in the automatic transmission 20, a dog brake may be used as the brake B2 that is continuously engaged when the first to fourth forward speeds are formed and that is engaged when the reverse speed is formed. In the automatic transmission 20, at least one of the first and second planetary gears 21, 22 may be a double-pinion type planetary gear, and the Ravigneaux type planetary gear mechanism 25 may be replaced with a compound planetary gear train such as a Simpson or CR-CR compound planetary gear train. The automatic transmission 20 described above may be modified to be mounted on a front wheel drive vehicle.

The specific configuration of the automatic transmission 20 will be described in detail below with reference to FIGS. 4 to 8.

Figure 4:
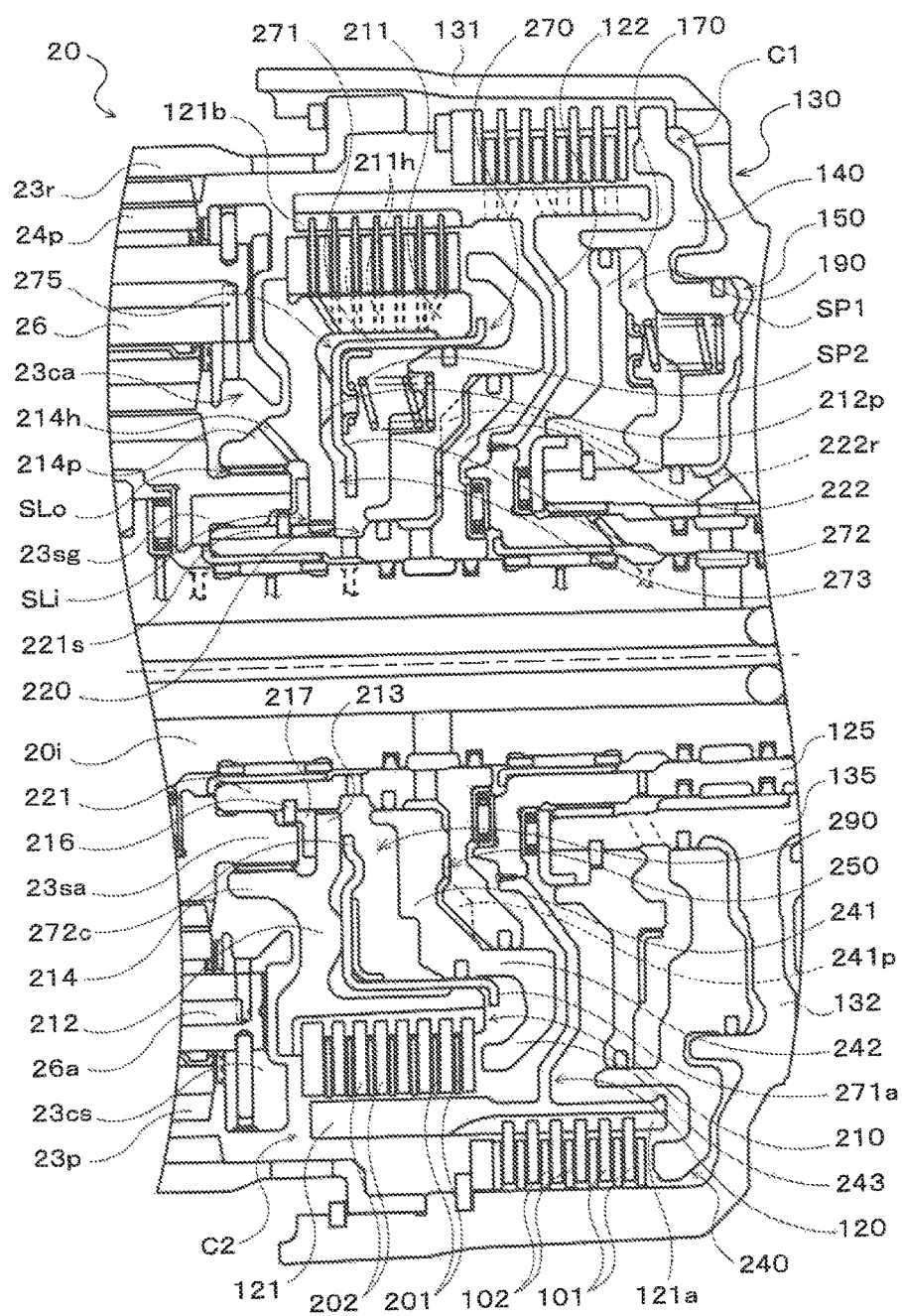
FIG. 4 is an enlarged sectional view showing a main part of the speed change device of FIG. 1.
Figure 5:
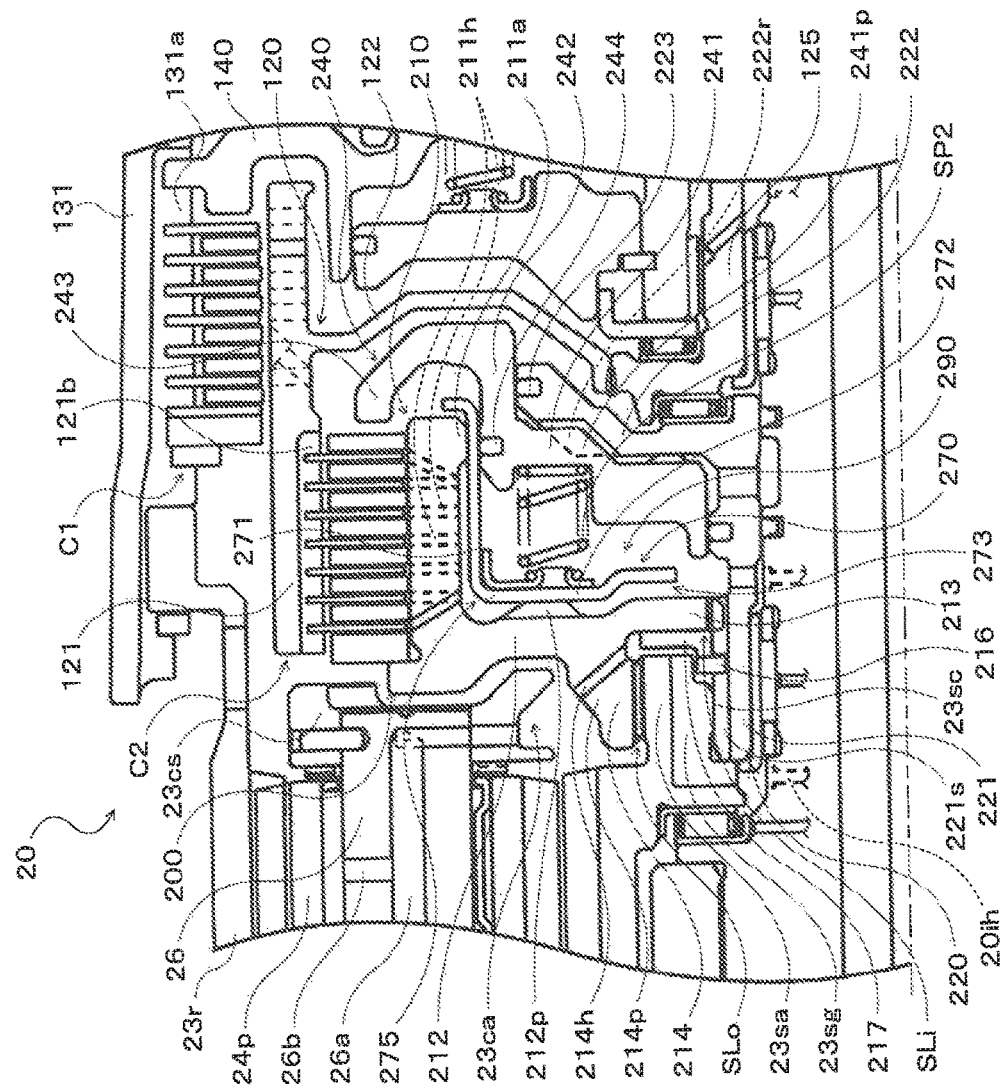
FIG. 5 is an enlarged sectional view showing a main part of the speed change device of FIG. 1.

FIGS. 4 and 5 are enlarged sectional views showing a main part of the automatic transmission 20. These figures show the configuration around the clutches C1, C2 included in the automatic transmission 20. In the present embodiment, the clutch C1 is disposed between the second planetary gear 22 and the Ravigneaux type planetary gear mechanism 25 so as to be located near the second planetary gear 22. The clutch C2 is disposed between the second planetary gear 22 and the Ravigneaux type planetary gear mechanism 25 so that at least a part of the clutch C2 is surrounded by a constituent member of the clutch C1 and so that the clutch C2 is located near the Ravigneaux type planetary gear mechanism 25 (third planetary gear).

As described above, both of the clutches C1, C2 connect the same elements, namely the first sun gear 21s of the first planetary gear 21 and the second sun gear 22s of the second planetary gear 22. Accordingly, as shown in FIGS. 4 and 5, the clutches C1, C2 share a drum member 120 that is constantly coupled (fixed) to the first sun gear 21s and the second sun gear 22s of the second planetary gear 22 and that functions as a clutch hub of the clutch C1 and a clutch drum of the clutch C2. As described above, the clutch C1 connects the same element as that to be connected by the clutch C3, namely the third ring gear 23r of the Ravigneaux type planetary gear mechanism 25. Accordingly, the clutches C1, C3 share a drum member 130 that is constantly coupled (fixed) to the third ring gear 23r and that functions as a clutch drum of the clutch C1 and a clutch hub of the clutch C3.

The drum member 120 includes a tubular portion 121 that is shared by the clutches C1, C2, and an annular portion 122 extended radially inward from the inner peripheral surface of the tubular portion 121. Splines 121a are formed in the outer peripheral surface of half of the tubular portion 121 which is located on the second planetary gear 22 side (the right side in FIGS. 3 and 4), and splines 121b are formed in the inner peripheral surface of half of the tubular portion 121 which is located on the Ravigneaux type planetary gear mechanism 25 side (the left side in FIGS. 3 and 4). The annular portion 122 is welded at its inner periphery to a coupling member 125, and the drum member 120 is constantly coupled (fixed) via the coupling member 125 to the first sun gear 21s of the first planetary gear 21 and the second sun gear 22s of the second planetary gear 22, which are elements to be connected by the clutches C1, C2.

The drum member 130 includes a drum portion 131 that is used by the clutch C1, an annular wall portion 132 extended radially inward from the drum portion 131, a hub portion, not shown, that is used by the clutch C3, and a tubular support portion 135. In the present embodiment, the drum portion 131, the annular wall portion 132, the hub portion, and the support portion 135 are formed as a single-piece member by casting, e.g., an aluminum alloy etc. The drum portion 131 has an opening-side end (left end in FIGS. 4 and 5) that is constantly coupled (fixed) to the third ring gear 23r of the Ravigneaux type planetary gear mechanism 25, which is an element to be connected by the clutches C1, C3. Splines 131a (see FIG. 5) are formed in the inner peripheral surface of the drum portion 131, and the outer peripheral surface of the drum portion 131 (cylindrical portion) is a smooth cylindrical surface. Strength of the drum portion 131 can thus be ensured without increasing the thickness thereof.

The hub portion of the drum member 130 is extended from the annular wall portion 132 to the opposite side from the opening-side end of the drum portion 131 (the right side in FIGS. 4 and 5). In the present embodiment, the hub portion of the drum member 130 has a tubular shape having a smaller outside diameter than the drum portion 131. Splines are formed in the outer peripheral surface of the hub portion, and the inner peripheral surface of the hub portion is a smooth concave cylindrical surface. Strength of the hub portion can thus be ensured without increasing the thickness thereof. In the present embodiment, the support portion 135 is extended in the axial direction from the inner periphery of the annular wall portion 132 toward the second planetary gear 22 and the Ravigneaux type planetary gear mechanism 25, and is rotatably supported by the outer peripheral surface of the coupling member 125 via a bush, a radial bearing, etc.

The clutch C1 including the drum members 120, 130 as its constituent members includes, in addition to the drum members 120, 130, a plurality of friction plates (friction engagement plates) 101, a plurality of separator plates (friction engagement plates) 102 and a backing plate which are arranged alternately with the friction plates 101, a piston 140 that presses the friction plates 101 and the separator plates 102 so as to cause the friction plates 101 and the separator plates 102 to frictionally engage with each other, a plurality of return spring (coil springs) SP1 that bias the piston 140 so as to separate the piston 140 from the friction plates 101 and the separator plates 102, and an annular cancel plate (cancel chamber defining member) 170.

The plurality of friction plates 101 (their inner peripheral portions) of the clutch C1 are fitted on the splines 121a of the tubular portion 121 of the drum member 120 surrounded by the drum portion 131 of the drum member 130. The plurality of friction plates 101 are thus supported by the drum member 120 that functions as a clutch hub so that the friction plates 101 rotate with the tubular portion 121 and can move in the axial direction. The plurality of separator plates 102 (their outer peripheral portions) of the clutch C1 are fitted on the splines 131a formed in the inner peripheral surface of the drum portion 131 of the drum member 130. The plurality of separator plates 102 are thus supported by the drum member 130 that functions as a clutch drum so that the separator plates 102 rotate with the drum portion 131 and can move in the axial direction.

The piston 140 is disposed between the annular wall portion 132 of the drum member 130 and the tubular portion 121 of the drum member 120 in the axial direction, and is supported by the support portion 135 of the drum member 130 so that the piston 140 rotates with the drum member 130 and can move in the axial direction. As shown in FIGS. 4 and 5, the piston 140 together with the annular wall portion 132 and the support portion 135 of the drum member 130 defines an engagement oil chamber (first engagement oil chamber) 150 of the clutch C1. The cancel plate 170 is disposed between the piston 140 and the annular portion 122 of the drum member 120 in the axial direction, namely on the opposite side of the piston 140 from the annular wall portion 132 of the drum member 130, and is fixed to the support portion 135 with a snap ring. As shown in FIGS. 4 and 5, the cancel plate 170 together with the piston 140 and the support portion 135 defines a centrifugal oil pressure cancel chamber (first centrifugal oil pressure cancel chamber) 190 in which a centrifugal oil pressure generated in the engagement oil chamber 150 is cancelled. The engagement oil chamber 150 and the centrifugal oil pressure cancel chamber 190 of the clutch C1 are thus defined by the drum member 130, the piston 140, and the cancel plate 170 which rotate with the third ring gear 23r (first output element) of the Ravigneaux type planetary gear mechanism 25.

An engagement oil pressure (hydraulic oil) for the clutch C1, which has been regulated by the hydraulic control device, is supplied to the engagement oil chamber 150 of the clutch C1 through oil passages formed in the input shaft 20i, the coupling member 125, and the support portion 135 of the drum member 130. Hydraulic oil (e.g., drain oil for lubrication and cooling) from the hydraulic control device is supplied to the centrifugal oil pressure cancel chamber 190 through oil passages formed in the input shaft 20i, the coupling member 125, and the support portion 135 of the drum member 130, etc. The plurality of return springs SP1 are arranged at intervals in the circumferential direction in the centrifugal oil pressure cancel chamber 190 so as to be located between the piston 140 and the cancel plate 170. Instead of the plurality of coil springs, a single leaf spring may be used as the return springs SP1 of the clutch C1.

The clutch C2 including the drum member 120 as its constituent member includes, in addition to the drum member 120, a clutch hub 200 serving as a power transmission member that transmits power from the third sun gear 23s of the Ravigneaux type planetary gear mechanism 25 to the first and second sun gears 21s, 22s (other rotary elements) that are constantly coupled together, a plurality of friction plates (first friction engagement plates) 201, a plurality of separator plates 202 (second friction engagement plates) and a backing plate, a piston 240 that presses the friction plates 201 and the separator plates 202 to cause the friction plates 201 and the separator plates 202 to frictionally engage with each other, a cancel chamber defining member 270, and a plurality of return springs (coil springs) SP2 that bias the piston 240 so as to separate the piston 240 from the friction plates 201 and the separator plates 202.

As shown in FIGS. 4 and 5, the clutch hub 200 has a hub member (hub portion) 210 on which the inner peripheral portions of the plurality of separator plates and the backing plate are fitted, and a support member 220 that supports the piston 240. The hub member 210 is made of, e.g., an aluminum alloy etc. and has a tubular portion 211 and an annular wall portion 212 extending radially inward from one end (the left end in FIGS. 4 and 5) of the tubular portion 211. That is, the tubular portion 211 and the annular wall portion 212 are formed as a single-piece member by casting an aluminum alloy etc. The support member 220 is made of an iron alloy etc. and has a tubular shaft portion 221 and an annular engagement oil chamber defining portion 222 extending radially outward from one end of the shaft portion 221. That is, the shaft portion 221 and the engagement oil chamber defining portion 222 are formed as a single-piece member by casting an iron alloy etc. As shown in FIGS. 4 and 5, the support member 220 (shaft portion 221) of the clutch hub 200 is coaxially and rotatably supported by the input shaft 20i via a radial bearing.

Figure 6:
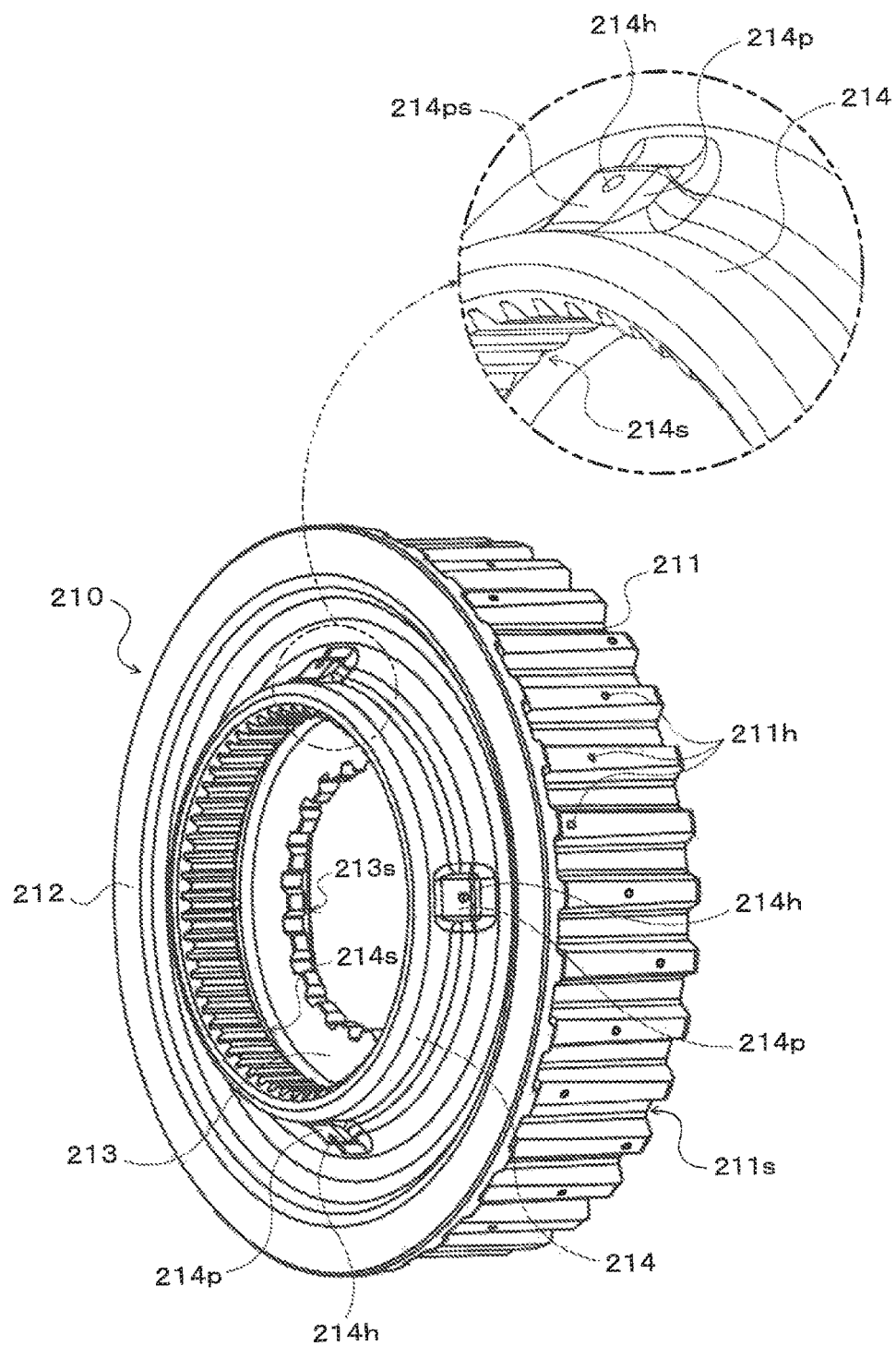
FIG. 6 is a perspective view showing a hub member of a clutch hub included in the speed change device of FIG. 1.
Figure 7:
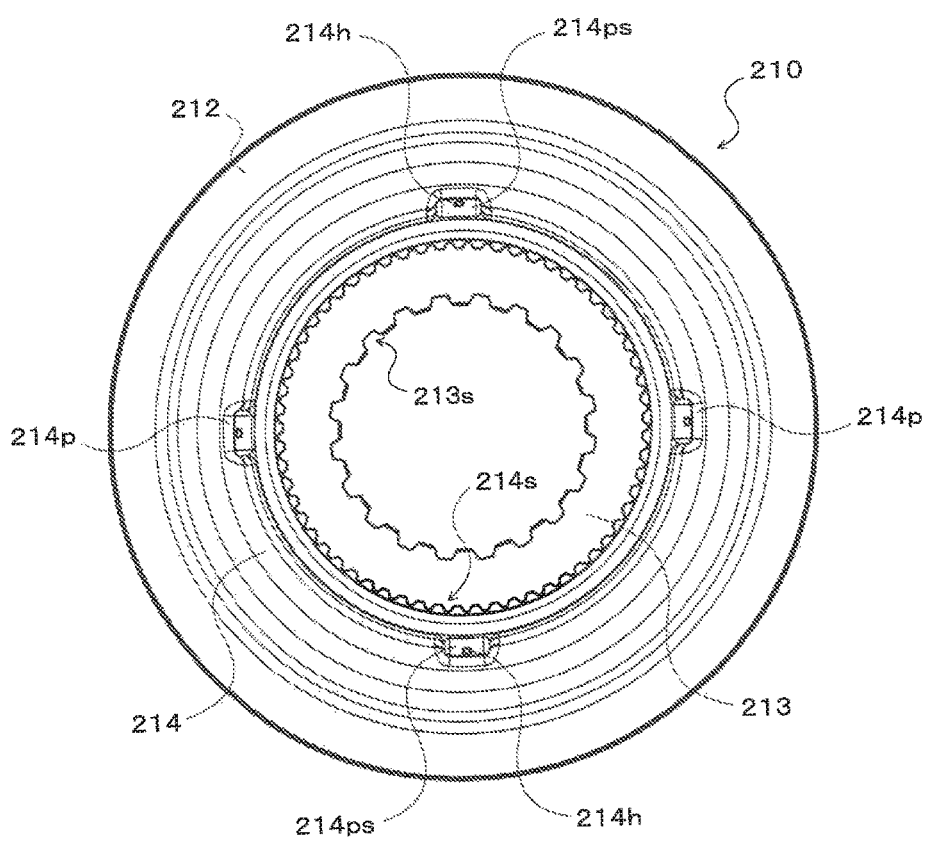
FIG. 7 is a front view showing the hub member of the clutch hub included in the speed change device of FIG. 1.
Figure 8:
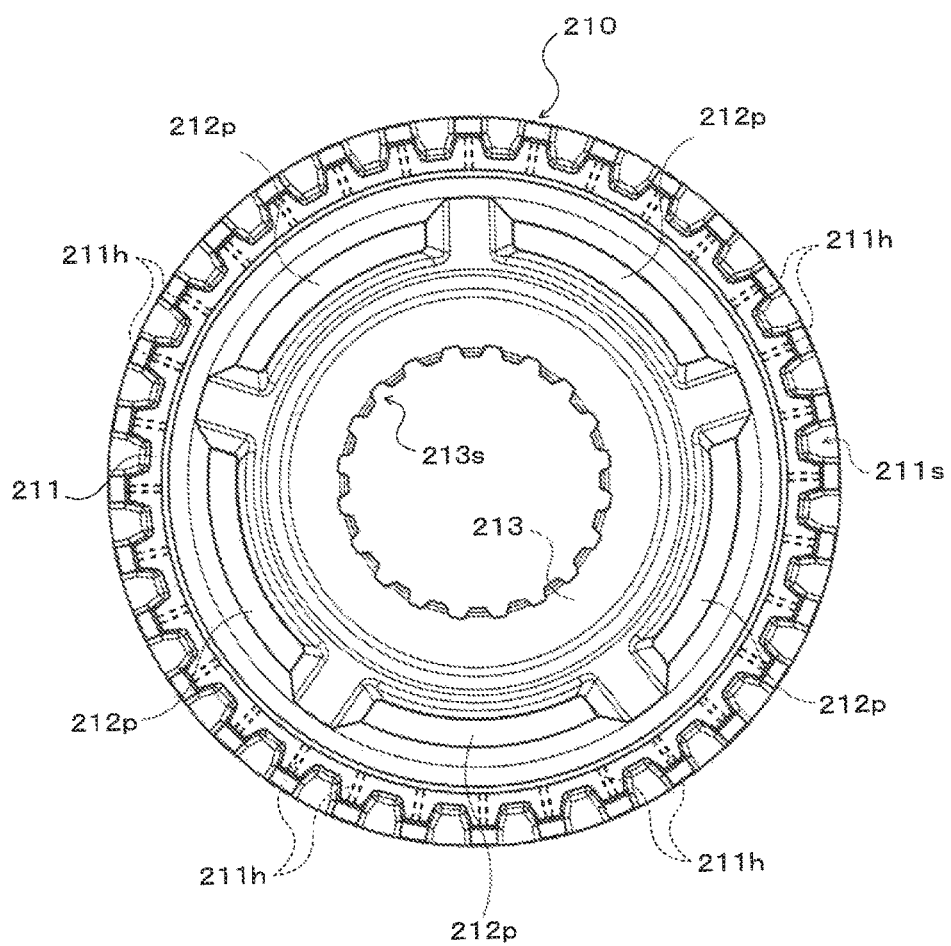
FIG. 8 is a rear view showing the hub member of the clutch hub included in the speed change device of FIG. 1.

As shown in FIGS. 6 and 8, the tubular portion 211 of the hub member 210 has splines 211s formed in its outer peripheral surface, and a plurality of oil holes 211h extending through the tubular portion 211, namely through the tip portions of the splines 211s, in the radial direction. A part of the plurality of oil holes 211h which is located at both ends of the tubular portion 211 is formed so as to be slightly tilted with respect to the radial direction of the tubular portion 211, as shown in FIGS. 4 and 5. The annular wall portion 212 of the hub member 210 has an inner peripheral portion 213 that is loosely spline-fitted (loosely fitted) on the shaft portion 221 of the support member 220. That is, as shown in FIGS. 6 to 8, splines 213s are formed in the inner peripheral surface of the inner peripheral portion 213, and the splines 213s are loosely fitted on splines 221s (see FIG. 4) formed in the outer peripheral surface of the distal end (free end) of the shaft portion 221. The splines 213s of the inner peripheral portion 213 and the splines 221s of the shaft portion 221 form an inner spline-fitting portion SLi.

The annular wall portion 212 further has a tubular projecting portion 214 located radially inside the tubular portion 211 and radially outside the inner peripheral portion 213 and projecting to the opposite side from the tubular portion 211 (the left side in FIGS. 4 and 5, namely toward the Ravigneaux type planetary gear mechanism 25). As shown in FIGS. 4 and 5, the axial length of the projecting portion 214 is greater than that of the inner peripheral portion 213 of the annular wall portion 212, and as shown in FIGS. 6 and 7, splines 214s are formed in the inner peripheral surface of the projecting portion 214. The splines 214s of the projecting portion 214 are fitted on splines formed in the outer peripheral surface of a shaft portion 23sa extended in the axial direction from the third sun gear 23s (second output element) of the Ravigneaux type planetary gear mechanism 25. The splines 214s of the projecting portion 214 and the splines of the third sun gear 23s form an outer spline-fitting portion SLo.

As described above, the projecting portion 214 is located radially outside the inner peripheral portion 213 of the annular wall portion 212. Accordingly, the outer spline-fitting portion SLo, which is a portion where the hub member 210 is fitted on the third sun gear 23s, is located radially outside the inner spline-fitting portion SLi, which is a portion where the hub member 210 is fitted on the shaft portion 221 (support member 220). As described above, the inner peripheral portion 213 of the annular wall portion 212 has a shorter axial length than the projecting portion 214. The axial length of the inner spline-fitting portion SLi is therefore smaller than that of the outer spline-fitting portion SLo.

In the present embodiment, circumferential clearance in the outer spline-fitting portion SLo, namely circumferential clearance between the tooth surface of the spline 214s of the projecting portion 214 and the tooth surface of the spline of the shaft portion 23sa, is designed to be very small. The inner peripheral portion of the projecting portion 214 is thus tightly spline-fitted on the shaft portion 23sa so as to rotate with the third sun gear 23s, which is an element to be connected by the clutch C2. On the other hand, circumferential clearance in the inner spline-fitting portion SLi, namely circumferential clearance between the tooth surface of the spline 213s of the inner peripheral portion 213 and the tooth surface of the spline 221s of the shaft portion 221, is designed to be larger than the circumferential clearance in the outer spline-fitting portion SLo. The inner peripheral portion 213 is thus loosely fitted on the shaft portion 221 so as not to rotate relative to the shaft portion 221 of the support member 220. That is, the support member 220 having the shaft portion 221 and the engagement oil chamber defining portion 222 which are formed as a single-piece member is prevented from rotating relative to the hub member 210 by the inner spline-fitting portion SLi.

As shown in FIGS. 4 and 5, the projecting portion 214 of the hub member 210 which is spline-fitted on the third sun gear 23s is located radially inside a part of the third carrier 23c of the Ravigneaux type planetary gear mechanism 25, namely a shaft support portion 23cs that supports the ends of pinion shafts 26 inserted through the third pinion gears 23p and the fourth pinion gears 24p. As shown in the figures, an oil collecting portion (recess) 23ca is formed in the inner peripheral surface of the shaft support portion 23cs of the third carrier 23c so as to communicate with axial oil passages (in-shaft oil passages) 26a formed in the pinion shafts 26. The projecting portion 214 is surrounded by the oil collecting portion 23ca. The oil collecting portion 23ca need not necessarily be formed in the third carrier 23c (shaft support portion 23cs), and may be formed in an oil receiver attached to the third carrier 23c.

As shown in FIGS. 6 and 7, the projecting portion 214 of the hub member 210 has a plurality of raised portions 214p formed at intervals (at regular intervals) in the circumferential direction. Each raised portion 214p projects from the outer peripheral surface of the projecting portion 214 toward the oil collecting portion 23ca formed in the shaft support portion 23cs of the third carrier 23c, and has a substantially flat top surface 214ps. The projecting portion 214 further has a plurality of (e.g., four in the present embodiment) oil holes 214h formed at intervals (at regular intervals) in the circumferential direction and each extending through a corresponding one of the raised portions 214p (projecting portion 214) and opening at the top surface 214ps of this raised portion 214p. That is, the radially outer (third carrier 23c side) opening of each oil hole 214h is surrounded by the raised portion 214p. As shown in FIGS. 4 and 5, each oil hole 214h is tilted so as to be located closer to the oil collecting portion 23ca of the third carrier 23c (Ravigneaux type planetary gear mechanism 25) as it extends farther away from the inner peripheral surface of the projecting portion 214 toward the outside in the radial direction.

As shown in FIG. 5, the third sun gear 23s, which is an element to be connected by the clutch C2, has a central hole 23sc extending through a gear portion and the shaft portion 23sa in the axial direction. The distal end of the shaft portion 221 of the support member 220 is fitted by spigot joint (more loosely fitted than press fit) in the central hole 23sc at a position radially inside the inner peripheral surface of the projecting portion 214 so that the third sun gear 23s can be aligned. The third sun gear 23s, which is an element to be connected by the clutch C2, can thus be aligned with the input shaft 20i by the shaft portion 221 of the clutch hub 200. A snap ring 216 that restricts axial movement of the hub member 210 relative to the support member 220 is attached to the distal end of the shaft portion 221, and a spacer 217, which is an annular plate body made of an iron alloy, is interposed between the snap ring 216 and the inner peripheral portion 213 of the hub member 210. As shown in the figure, the outer peripheral surface of the snap ring 216 is supported from the outside in the radial direction by the inner peripheral surface of the third sun gear 23s. This can restrain the snap ring 216 from expanding in the radial direction.

As shown in FIGS. 4 and 5, the spacer 217 (inner peripheral portion 213) and the end face of the shaft portion 23sa of the third sun gear 23s face each other at an interval therebetween, and the space between the spacer 217 and the end face of the shaft portion 23sa of the third sun gear 23s communicates with each oil hole 214h of the projecting portion 214. The shaft portion 23sa of the third sun gear 23s has a plurality of oil grooves 23sg that allow the space between the spacer 217 and the end face of the shaft portion 23sa of the third sun gear 23s to communicate with the inside of the central hole 23sc. Hydraulic oil (e.g., drain oil for lubrication and cooling) from the hydraulic control device is supplied to each oil groove 23sg of the third sun gear 23s through oil holes 20ih formed in the input shaft 20i, etc.

Accordingly, when the third sun gear 23s and the clutch hub 200 rotate together, hydraulic oil serving as a lubricating and cooling medium is centrifugally supplied to the oil collecting portion 23ca of the third carrier 23c through the oil holes 20ih of the input shaft 20i, the oil grooves 23sg of the third sun gear 23s, the space between the spacer 217 and the end face of the shaft portion 23sa of the third sun gear 23s, and each oil hole 214h of the projecting portion 214. Hydraulic oil collected by the coil collecting portion 23a centrifugally flows into the axial oil passages 26a of the pinion shafts 26, and is supplied through radial oil passages (in-shaft oil passage) 26b communicating with the axial oil passages 26a to a needle bearing that supports the third and fourth pinion gears 23p, 24p.

The plurality of friction plates 201 (their inner peripheral portions) of the clutch C2 are fitted on the splines 121b formed in half of the tubular portion 121 of the drum member 120 which is located on the Ravigneaux type planetary gear mechanism 25 side (the left side in FIGS. 3 and 4). The plurality of friction plates 201 are thus supported by the drum member 120 that functions as a clutch drum so that the friction plates 201 rotate with the tubular portion 121 and can move in the axial direction. The plurality of separator plates 202 and the backing plate (their outer peripheral portions) of the clutch C2 are fitted on the splines 211s (see FIGS. 6 and 8) formed in the outer peripheral surface of the tubular portion 211 of the clutch hub 200. The plurality of separator plates 202 are thus supported by the clutch hub 200 so that the separator plates 202 rotate with the tubular portion 211 and can move in the axial direction.

As shown in FIGS. 4 and 5, the piston 240 of the clutch C2 has a pressure receiving portion 241 that is supported by the shaft portion 221 of the support member 220 so that the piston 240 can move in the axial direction, a tubular extended portion 242 that is extended in the axial direction from the outer periphery of the pressure receiving portion 241, and a plate pressing portion 243 that is extended radially outward from the free end of the extended portion 242 so as to contact the separator plate 202 located farthest from the Ravigneaux type planetary gear mechanism 25. The piston 240 is fitted on the shaft portion 221 so that the piston 240 can move in the axial direction and so that the pressure receiving portion 241 is located closer to the engagement oil chamber defining portion 222 than the splines 221s of the shaft portion 221 are. The piston 240 is surrounded by the tubular portion 121 of the drum member 120.

The inner peripheral surface of the extended portion 242 of the piston 240 is in sliding contact with the outer peripheral surface of the engagement oil chamber defining portion 222, and a sealing member 223 is disposed between the inner peripheral surface of the extended portion 242 and the outer peripheral surface of the engagement oil chamber defining portion 222. An engagement oil chamber 250 of the clutch C2 is thus defined by the pressure receiving portion 241 and the extended portion 242 of the piston 240 and the engagement oil chamber defining portion 222 of the support member 220. An engagement oil pressure (hydraulic oil) for the clutch C2, which has been regulated by the hydraulic control device, is supplied to the engagement oil chamber 250 through oil passages formed in the input shaft 20i, the shaft portion 221, etc., and the pressure receiving portion 241 of the piston 240 receives the engagement oil pressure.

The pressure receiving portion 241 of the piston 240 has a plurality of projections 241p formed at intervals in the circumferential direction (in the present embodiment, two projections 241p at intervals of 180°) so as to project toward the engagement oil chamber defining portion 222. The engagement oil chamber defining portion 222 has a plurality of recesses 222r formed at intervals in the circumferential direction (in the present embodiment, two recesses 222r at intervals of 180°. Each projection 241p of the piston 240 is loosely fitted in a corresponding one of the recesses 222r of the engagement oil chamber defining portion 222. The projections 241p are thus engaged with the recesses 222r, whereby the piston 240 can be prevented from rotating relative to the engagement oil chamber defining portion 222, namely the support member 220, and can be prevented from rotating relative to the hub member 210 via the support member 220 (the shaft portion 221 and the engagement oil chamber defining portion 222). The piston 240 and the engagement oil chamber defining portion 222 need only to have at least one projection 241p and at least one recess 222r, and may have three or more projections 241p and three or more recesses 222r. Alternatively, the engagement oil chamber defining portion 222 may have at least one projection, and the piston 240 may have a recess that engages with the projection.

The cancel chamber defining member 270 of the clutch C2 is fitted in the tubular portion 211 of the hub member 210, and together with the piston 240 defines a centrifugal oil pressure cancel chamber 290 in which a centrifugal oil pressure generated in the engagement oil chamber 250 is cancelled. In the automatic transmission 20, the engagement oil chamber 250 and the centrifugal oil pressure cancel chamber 290 are thus defined inside the tubular portion 211 by the clutch hub 200, the piston 240, and the cancel chamber defining member 270 which rotate with the third sun gear 23s (second output element) of the Ravigneaux type planetary gear mechanism 25. Hydraulic oil (e.g., drain oil for lubrication and cooling) from the hydraulic control device is supplied to the centrifugal oil pressure cancel chamber 290 through oil passages formed in the input shaft 20i, the shaft portion 221, etc.

As shown in FIGS. 4 and 5, the cancel chamber defining member 270 has a cylindrical sleeve portion 271 fitted in the tubular portion 211 of the hub member 210, and an annular flange portion 272 extended radially inward from one end (the left end in FIGS. 4 and 5) of the sleeve portion 271 and extending along the surface of the annular wall portion 212 of the hub member 210. The inner peripheral surface of the sleeve portion 271 is in sliding contact with the outer peripheral surface of the extended portion 242 of the piston 240, and a sealing member 244 is disposed between the inner peripheral surface of the sleeve portion 271 and the outer peripheral surface of the extended portion 242. The plurality of return springs SP2 are arranged side by side in the circumferential direction between the flange portion 272 and the pressure receiving portion 241 of the piston 240. One end (the right end in FIGS. 4 and 5) of each return spring SP2 is fitted in a corresponding one of a plurality of spring holding recesses formed in the pressure receiving portion 241 of the piston 240, and the other end of each return spring SP2 is held by a spring seat supported by the cancel chamber defining member 270. This allows the cancel chamber defining member 270 to be pressed against the hub member 210 and fixed to the clutch hub 200 by the plurality of return springs SP2 without using a dedicated fixing part etc. Instead of the plurality of coil springs, a single leaf spring may be used as the return springs SP2 of the clutch C2.

The inner peripheral surface of the tubular portion 211 of the hub member 210 is a concave cylindrical surface, and the inner peripheral surface of the free end of the tubular portion 211 has an annular projection 211a projecting radially inward and contacting the outer peripheral surface of the sleeve portion 271 of the cancel chamber defining member 270 along the entire circumference. The annular wall portion 212 of the hub member 210 has a plurality of arc-shaped projections 212p formed at intervals in the circumferential direction (in the present embodiment, five projections 212p at regular intervals) so as to be opposed to the return springs SP2 and to contact the flange portion 272 of the cancel chamber defining member 270. The inner peripheral portion of the flange portion 272 of the cancel chamber defining member 270 has a plurality of contact portions 272c (see FIG. 4) formed at intervals in the circumferential direction so as to project toward the annular wall portion 212 and to contact the surface of the annular wall portion 212.

Accordingly, the cancel chamber defining member 270 is pressed against the hub member 210 by the plurality of return springs SP2, and thus together with the inner peripheral surface of the tubular portion 211 and the surface of the annular wall portion 212 on the piston 240 side defines a lubricating oil chamber 275. That is, an annular space (oil reservoir) with its one end (the right end in FIGS. 4 and 5) closed by the annular projection 211a is defined between the inner peripheral surface of the tubular portion 211 and the outer peripheral surface of the sleeve portion 271. A space communicating with the annular space and a plurality of communication passages each extending between adjoining ones of the projections 212p are defined between the surface of the flange portion 272 which contacts the projections 212p and the surface of the annular wall portion 212. As shown in FIGS. 4 and 5, a plurality of communication ports 273 are formed between adjoining ones of the contact portions 272c of the flange portion 272.

As a result, the lubricating oil chamber 275 extends along the inner peripheral surface of the tubular portion 211 and the surface of the annular wall portion 212, and communicates with the centrifugal oil pressure cancel chamber 290 on the side closer to the shaft portion 221 of the support member 220, namely on the side closer to the inner periphery of the clutch hub 200, through the plurality of communication ports 273. The lubricating oil chamber 275 also communicates with the outside of the tubular portion 211, namely communicates with the friction plates 201 and the separator plates 202, through the plurality of oil holes 211h formed in the tubular portion 211. In the present embodiment, a free end 271a of the sleeve portion 271 is curved radially outward along the entire circumference, and the inner peripheral surface of the free end 271a has a round shape. This can satisfactorily restrain the sealing member 244 from being damaged when the piston 240 (extended portion 242) provided with the sealing member 244 is fitted into the sleeve portion 271.

Operation etc. of the automatic transmission 20 will be described below.

In the automatic transmission 20 described above, when the clutch C2 is engaged in order to form the first forward speed, the third forward speed, the fifth forward speed, or the tenth forward speed, torque that is output from the third sun gear 23s (second output element) of the Ravigneaux type planetary gear mechanism 25 is transmitted via the clutch hub 200, the separator plates 202, the friction plates 201, the drum member 120, and the coupling member 125 to the first sun gear 21s of the first planetary gear 21 and the second sun gear 22s of the second planetary gear 22 which are constantly coupled together. In the clutch C2, the projecting portion 214 of the hub member 210 is tightly spline-fitted on the shaft portion 23sa so as to rotate with the third sun gear 23s, whereas the inner peripheral portion 213 of the annular wall portion 212 is loosely spline-fitted (loosely fitted) on the shaft portion 221 so as not to allow the hub member 210 to rotate relative to the support member 220. That is, the circumferential clearance in the inner spline-fitting portion SLi that is formed by the splines 213s of the inner peripheral portion 213 and the splines 221s of the shaft portion 221 is larger than the circumferential clearance in the outer spline-fitting portion SLo that is formed by the splines 214s of the projecting portion 214 and the splines of the third sun gear 23s.

In the clutch C2 of the automatic transmission 20, the support member 220, namely the shaft portion 221 and the engagement oil chamber defining portion 222 which are formed as a single-piece member, can therefore be prevented from rotating relative to the hub member 210, and no torque is allowed to be transmitted from the hub member 210 to the shaft portion 221 and the engagement oil chamber defining portion 222. Accordingly, the size and weight of the support member 220, namely the shaft portion 221 and the engagement oil chamber defining portion 222 which are formed as a single-piece member, and thus the overall size and weight of the clutch hub 200, can be reduced, and durability thereof can also be improved.

The outer spline-fitting portion SLo is located radially outside the inner spline-fitting portion SLi. The outer spline-fitting portion SLo, which is a portion where the projecting portion 214 is fitted on the third sun gear 23s, can thus be made to have a larger torque radius. Accordingly, the axial length of the projecting portion 214 can be reduced, and an increase in axial length of the clutch C2 can be restrained. Since no torque is transmitted through the inner spline-fitting portion SLi, which is a portion where the inner peripheral portion 213 of the annular wall portion 212 is fitted on the shaft portion 221 of the support member 220, the inner spline-fitting portion SLi, namely the inner peripheral portion 213, need only to have an axial length long enough to prevent the support member 220 (the shaft portion 221 and the engagement oil chamber defining portion 222) from rotating relative to the hub member 210. Accordingly, in the clutch C2, the axial length of the inner peripheral portion 213 of the annular wall portion 212 can be made smaller than that of the projecting portion 214, whereby the axial length can further be reduced.

When the third forward speed, the fifth forward speed, and the tenth forward speed are formed in the automatic transmission 20, the brake B1 is engaged in addition to the clutch C2, whereby the fourth sun gear 24s (fixable element) of the Ravigneaux type planetary gear mechanism 25 is held stationary (see FIG. 2). Accordingly, the speed of power transmitted from the input shaft 20i to the third carrier 23c (input element) is increased by the Ravigneaux type planetary gear mechanism 25 so that the rotational speed of the third sun gear 23s (second output element) becomes higher than that of the third ring gear 23r (first output element), and the resultant power is transmitted to the third sun gear 23s and the third ring gear 23r (see FIG. 3). When the automatic transmission 20 is in operation, the third sun gear 23s (and the third ring gear 23r) of the Ravigneaux type planetary gear mechanism 25 thus rotates at a rotational speed equal to or higher than that of the third carrier 23c, namely the input shaft 20i, except when the reverse speed is formed. Accordingly, reducing the size and weight of the clutch hub 200 of the clutch C2 and improving durability thereof can reduce inertia for rotation of the third sun gear 23s that rotates at a higher speed than the input shaft 20i and the third ring gear 23r, and the clutch hub 200 that rotates with the third sun gear 23s, thereby improving shift performance of the automatic transmission 20 and satisfactorily ensuring durability of the automatic transmission 20.

In the clutch C2, the pressure receiving portion 241 of the piston 240 has the plurality of projections 241p that project toward the engagement oil chamber defining portion 222, and the engagement oil chamber defining portion 222 has the recesses 222r that engage with the respective projections 241p. Accordingly, an increase in size of the clutch C2 can be restrained, and the support member 220, namely the shaft portion 221 and the engagement oil chamber defining portion 222 which are formed as a single-piece member, can prevent the piston 240 from rotating relative to the hub member 210. Relative rotation between the piston 240 and the engagement oil chamber defining portion 222 and relative rotation between the piston 240 and the hub member 210 can thus be satisfactorily restricted, and wear of the piston 240 and the engagement oil chamber defining portion 222 can be satisfactorily restrained, whereby durability of the clutch hub 200 can be improved. Since the projections 241p are formed in the pressure receiving portion 241 of the piston 240, reduction in thickness of the pressure receiving portion 241 can be restrained, and durability of the piston 240 can be satisfactorily ensured. In addition, since relative rotation between the third sun gear 23s that rotates at a higher rotational speed than the input shaft 20i and the third ring gear 23r and the constituent members of the clutch hub 200 that rotates with the third sun gear 23s is satisfactorily restricted and durability thereof is improved, durability of the automatic transmission 20 can further be improved.

In the clutch C2, the space defined by the tubular portion 211 and the annular wall portion 212 of the hub member 210 and the piston 240 is divided into the centrifugal oil pressure cancel chamber 290 and the lubricating oil chamber 275 by the cancel chamber defining member 270, and the centrifugal oil pressure cancel chamber 290 and the lubricating oil chamber 275 communicate with each other on the side closer to the shaft portion 221 of the support member 220 of the clutch hub 200. A part of hydraulic oil supplied to the centrifugal oil pressure cancel chamber 290 defined inside the tubular portion 211 thus flows into the lubricating oil chamber 275, whereby hydraulic oil for lubrication and cooling can be satisfactorily supplied to the friction plates 201 and the separator plates 202 which are arranged around the tubular portion 211. Since hydraulic oil for lubrication and cooling can be satisfactorily supplied to the friction plates 201 and the separator plates 202 of the clutch C2 that is to connect the third sun gear 23s that rotates at a higher rotational speed than the input shaft 20i and the third ring gear 23r, durability of the automatic transmission 20 can further be improved. Moreover, in clutch C2, long tilted holes need not be formed in the tubular portion 211 of the hub member 210, an increase in machining cost and reduction in durability of the clutch hub 200 can be satisfactorily restrained.

The cancel chamber defining member 270 includes the sleeve portion 271 fitted in the tubular portion 211 of the hub member 210, and the flange portion 272 extended radially inward from one end of the sleeve portion 271, and the sealing member 244 is disposed between the inner peripheral surface of the sleeve portion 271 and the extended portion 242 of the piston 240. The plurality of return springs SP2 are arranged side by side in the circumferential direction between the flange portion 272 and the piston 240. This allows the cancel chamber defining member 270 to be pressed against the hub member 210 and fixed to the clutch hub 200 by the plurality of return springs SP2 without using a dedicated fixing part etc.

Moreover, the inner peripheral surface of the free end of the tubular portion 211 of the hub member 210 has the annular projection 211a projecting radially inward and contacting the outer peripheral surface of the sleeve portion 271. The annular wall portion 212 of the hub member 210 has the plurality of projections 212p formed at intervals in the circumferential direction so as to be opposed to the return springs SP2 and to contact the flange portion 272. The inner peripheral portion of the flange portion 272 has the plurality of contact portions 272c formed at intervals in the circumferential direction so as to project toward the annular wall portion 212 and to contact the surface of the annular wall portion 212. The communication ports 273 are formed between adjoining ones of the contact portions 272c so as to allow the lubricating oil chamber 275 and the centrifugal oil pressure cancel chamber 290 to communicate with each other. Accordingly, the lubricating oil chamber 275 can be defined so as to extend along the inner peripheral surface of the tubular portion 211 and the surface of the annular wall portion 212, outflow of hydraulic oil from the free end of the tubular portion 211 can be restricted, and the lubricating oil chamber 275 can be made to communicate with the centrifugal oil pressure cancel chamber 290 on the side closer to the shaft portion 221 of the support member 220.

The projecting portion 214 of the clutch hub 200 (hub member 210) has the plurality of raised portions 214p each projecting from the outer peripheral surface of the projecting portion 214 toward the oil collecting portion 23ca, and the plurality of oil holes 214h each tilted so as to be located closer to the oil collecting portion 23ca of the third carrier 23c as it extends to the outside in the radial direction and each extending through the projecting portion 214 and opening at the top surface 214ps of the raised portion 214p. The oil hole 214h opens at the top surface 214ps of each raised portion 214p formed in the projecting portion 214, and the opening of each oil hole 214h on the third carrier 23c side is surrounded by the raised portion 214p. This can restrain oil flowing out through the opening of each oil hole 214h from flowing on the outer peripheral surface of the projecting portion 214 even when the clutch hub 200 rotates with the third sun gear 23s at a high speed. Accordingly, hydraulic oil for lubrication and cooling can be satisfactorily supplied from each oil hole 214h formed in the projecting portion 214 of the clutch hub 200 to the axial oil passages 26a of the plurality of pinion shafts 26 supported by the third carrier 23c, etc.

The shaft portion 23sa of the third sun gear 23s has the central hole 23sc in which the distal end of the shaft portion 221 of the clutch hub 200 is fitted by spigot joint, and the oil grooves 23sg that allow the inside of the central hole 23sc to communicate with each oil hole 214h of the projecting portion 214. Accordingly, hydraulic oil can be supplied to each oil hole 214h of the projecting portion 214 of the hub member 210 when the hydraulic oil is supplied to the central hole 23sc of the third sun gear 23s. The inner peripheral portion 213 of the annular wall portion 212 of the hub member 210 is loosely fitted on the shaft portion 221 of the support member 220 at a position radially inside the inner peripheral surface (splines 214s) of the projecting portion 214, and faces the end face of the shaft portion 23sa of the third sun gear 23s at an interval therebetween. The shaft portion 221 of the support member 220 can thus be prevented from rotating relative to the hub member 210, and the oil grooves 23sg of the third sun gear 23s can be made to communicate with the oil holes 214h of the projecting portion 214.

Figure 9:
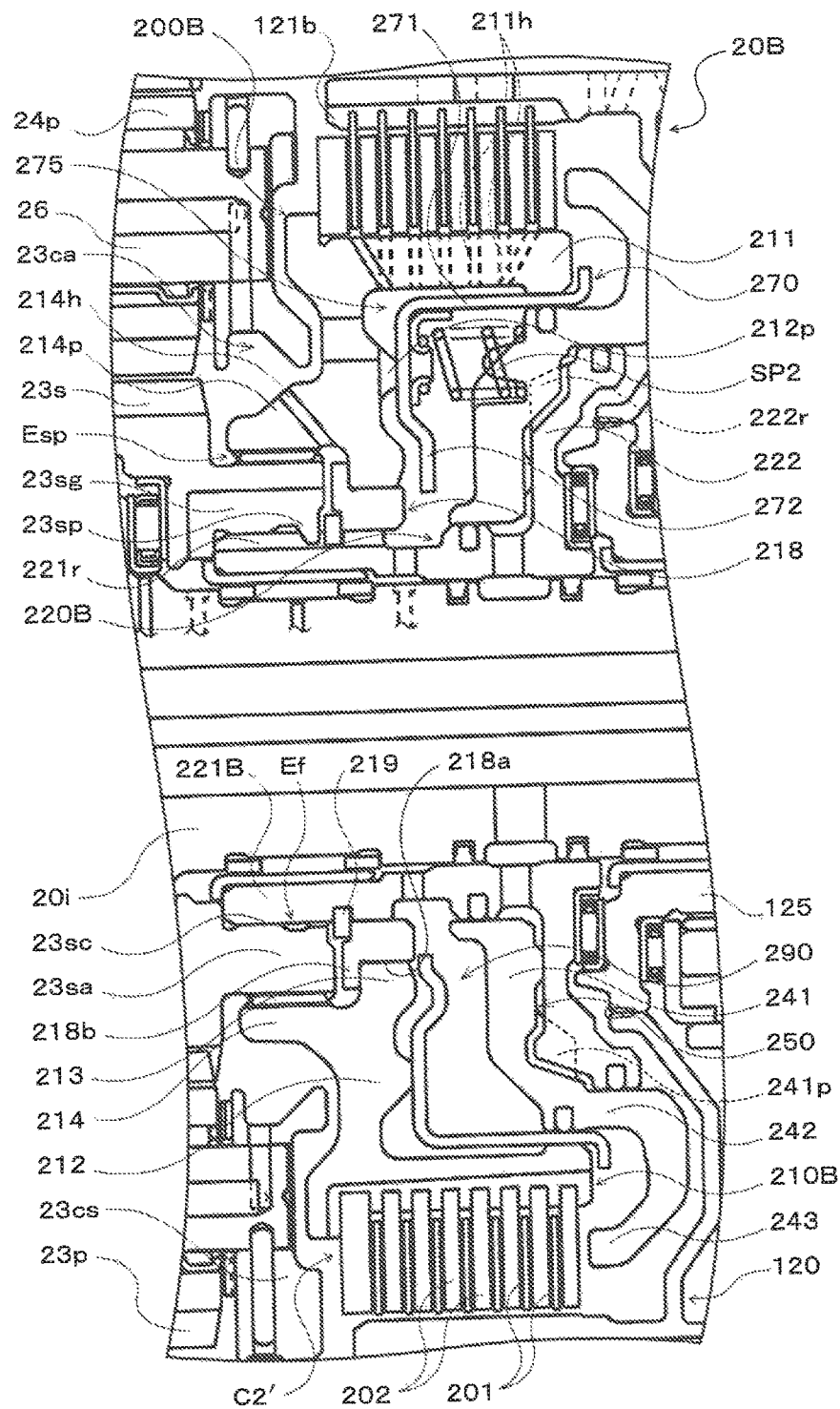
FIG. 9 is an enlarged sectional view showing a main part of another speed change device of the present disclosure.

FIG. 9 is an enlarged sectional view showing a main part of an automatic transmission 20B serving as another speed change device of the present disclosure. The automatic transmission 20B shown in the figure includes a clutch C2' different from the clutch C2. The configuration of the automatic transmission 20B is basically the same as that of the automatic transmission 20 except for the clutch C2'. Of the components of the automatic transmission 20B, the same components as those of the automatic transmission 20 are denoted with the same reference characters and detailed description thereof will be omitted.

The clutch C2' also includes the drum member 120 as its constituent member. The clutch C2' includes a clutch hub 200B serving as a power transmission member that transmits power from the third sun gear 23s of the Ravigneaux type planetary gear mechanism 25 to the first and second sun gears 21s, 22s (other rotary elements) that are constantly coupled together, a plurality of friction plates 201, a plurality of separator plates 202 and a backing plate, a piston 240 that presses the friction plates 201 and the separator plates 202 to cause the friction plates 201 and the separator plates 202 to frictionally engage with each other, a cancel chamber defining member 270, and a plurality of return springs (coil springs) SP2 that are disposed between the piston 240 and the cancel chamber defining member 270 (clutch hub 200) and that bias the piston 240 so as to separate the piston 240 from the friction plates 201 and the separator plates 202.

As shown in FIG. 9, the clutch hub 200B has a hub member (hub portion, hub) 210B on which the inner peripheral portions of the plurality of separator plates 202 and the backing plate are fitted, and a support member 220 that supports the piston 240. The hub member 210B is also made of, e.g., an aluminum alloy etc. and has a tubular portion 211 (i.e., tubular wall) having splines 211s formed in its outer peripheral surface, and an annular wall portion 212B (i.e., annular wall) extending radially inward from one end (the left end in FIGS. 4 and 5) of the tubular portion 211. An inner peripheral portion 213 (i.e., inner peripheral wall) of the annular wall portion 212B has a central hole (circular hole) with a larger diameter than a central hole of the annular wall portion 212 (inner peripheral portion 213) of the hub member 210. The annular wall portion 212B also has a tubular projecting portion 214 (i.e., tubular projecting wall) located radially inside the tubular portion 211 and radially outside the inner peripheral portion 213 and projecting to the opposite side from the tubular portion 211 (toward the Ravigneaux type planetary gear mechanism 25). The axial length of the projecting portion 214 is greater than that of the inner peripheral portion 213 of the annular wall portion 212B, and splines are formed in the inner peripheral surface of the projecting portion 214.

An annular sleeve member 218 (i.e., annular sleeve) is fitted by spigot joint in the inner peripheral portion 213 (central hole) of the annular wall portion 212B of the hub member 210B from the projecting portion 214 side. The sleeve member 218 has a radial support surface 218a supporting the inner peripheral surface of the inner peripheral portion 213 (hub member 210B), and an axial support portion 218b (i.e., axial support) projecting radially outward from the radial support surface 218. The axial support portion 218b has a smaller outside diameter than the inside diameter of the projecting portion 214 and supports the end face of the inner peripheral portion 213 on the projecting portion 214 side in the axial direction.

The support member 220B is made of an iron alloy etc. and has a tubular shaft portion 221B (i.e., tubular shaft) and an annular engagement oil chamber defining portion 222 extending radially outward from one end of the shaft portion 221B. The shaft portion 221B (i.e., engagement oil chamber defining wall) and the engagement oil chamber defining portion 22 are formed as a single-piece member. Both the shaft portion 221B and the engagement oil chamber defining portion 222 can thus be reduced in size and weight and durability thereof can be satisfactorily ensured. The support member 220B (shaft portion 221B) is coaxially and rotatably supported by the input shaft 20i via a radial bearing. The distal end of the shaft portion 221B has a plurality of (e.g., two to four) recesses 221r formed at intervals in the circumferential direction so as to extend in the axial direction.

After the piston 240, the snap rings SP2, and the cancel chamber defining member 270, etc. are attached to the support member 220B, the hub member 210B and the sleeve member 218 are attached to the support member 220B, and the distal end of the shaft portion 221B is fitted by spigot joint in a central hole of the sleeve member 218 fitted by spigot joint in the hub member 210B. The shaft portion 221B has a snap ring groove, and a snap ring 219 serving as a movement restricting member is placed in the snap ring groove so as to contact the surface of the sleeve member 218 on the axial support portion 218b side. The snap ring 219 thus receives the biasing force of the return springs SP2 through the hub member 210B and the axial support portion 218b of the sleeve member 218, so that axial movement of the hub member 210B relative to the shaft portion 221B (support member 220B) is restricted. The outer peripheral surface of the snap ring 219 is supported from the outside in the radial direction by the inner peripheral surface of a stepped portion formed in the sleeve member 218, whereby expansion of the snap ring 219 is restrained.

The third sun gear 23s is also attached to the support member 220B and the hub member 210B, and the shaft portion 221B is fitted by spigot joint in the central hole 23sc of the third sun gear 23s at a position radially inside the inner peripheral surface of the projecting portion 214 of the hub member 210B. A spigot-joint fitting portion Ef (i.e., spigot-joint fitting wall) between the shaft portion 221B and the third sun gear 23s is thus formed so as to adjoin the snap ring 219 in the axial direction. The splines of the projecting portion 214 are fitted on the splines formed in the outer peripheral surface of the shaft portion 23sa of the third sun gear 23s. As shown in FIG. 9, the shaft portion 23sa of the third sun gear 23s has a plurality of (e.g., two to four) projections 23sp formed at intervals in the circumferential direction, and each projection 23sp is loosely fitted in a corresponding one of the recesses 221r of the shaft portion 221B fitted by spigot joint in the central hole 23sc. The shaft portion 221B, namely the support member 220B, can thus be prevented from rotating relative to the third sun gear 23s and the hub member 210B.

The splines of the projecting portion 214 and the splines of the third sun gear 23s form a spline-fitting portion Esp (i.e., spline-fitting wall) at a position radially outside the spigot-joint fitting portion Ef between the shaft portion 221B and the third sun gear 23s. In the clutch C2', circumferential clearance in the outer spline-fitting portion Esp, namely circumferential clearance between the tooth surface of the spline 214s of the projecting portion 214 and the tooth surface of the spline of the shaft portion 23sa, is designed to be very small, whereas radial clearance in the outer spline-fitting portion Esp, namely clearance between the bottom of the spline 214s of the projecting portion 214 and the tip of the spline of the shaft portion 23sa, is designed to be somewhat large.

A pressure receiving portion 241 of the piston 240 of the clutch C2' also has a plurality of projections 241p formed at intervals in the circumferential direction so as to project toward the engagement oil chamber defining portion 222. The engagement oil chamber defining portion 222 also has a plurality of recesses 222r formed at intervals in the circumferential direction. Each projection 241p of the piston 240 is loosely fitted in a corresponding one of the recesses 222r of the engagement oil chamber defining portion 222. The projections 241p are thus engaged with the recesses 222r, whereby the piston 240 can be prevented from rotating relative to the engagement oil chamber defining portion 222, namely the support member 220, and can be prevented from rotating relative to the hub member 210 via the support member 220B (the shaft portion 221B and the engagement oil chamber defining portion 222).

As described above, the clutch hub 200B of the clutch C2' includes the hub member 210B on which the plurality of separator plates 202 are fitted, the tubular shaft portion 221B that movably supports the piston 240, and the engagement oil chamber defining portion 222 that together with the piston 240 defines an engagement oil chamber 250. The hub member 210B is spline-fitted on the third sun gear 23s of the Ravigneaux type planetary gear mechanism 25 so as to rotate with the third sun gear 23s, and the shaft portion 221B is rotatably supported by the input shaft 20i serving as a central shaft, and is fitted by spigot joint in the third sun gear 23s.

Since the hub member 210B of the clutch hub 200B is a separate member from the third sun gear 23s and is spline-fitted on the third sun gear 23s, machining accuracy of the third sun gear 23s can be satisfactorily ensured, and the hub member 210B and the third sun gear 23s can be made to rotate together. Since the shaft portion 221B of the clutch hub 200B which is rotatably supported by the input shaft 20i is fitted by spigot joint in the third sun gear 23s, the third sun gear 23s can be accurately supported (aligned) by the shaft portion 221B. As a result, in the clutch C2' including the clutch hub 200B that rotates with the third sun gear 23s of the Ravigneaux type planetary gear mechanism 25, machining accuracy and support accuracy of the third sun gear 23s can be satisfactorily ensured, and noise and vibrations can be satisfactorily restrained from being produced while the automatic transmission 20 is in operation.

In the clutch C2', the spline-fitting portion Esp between the projecting portion 214 of the hub member 210B and the third sun gear 23s is located radially outside the spigot-joint fitting portion Ef between the shaft portion 221B and the third sun gear 23s. This can further increase the torque radius of the spline-fitting portion Esp between the projecting portion 214 and the third sun gear 23s, whereby the axial length of the spline-fitting portion Esp can be reduced and an increase in axial length of the clutch C2' can be restrained.

In the clutch C2', the hub member 210B is supported in the radial direction by the annular sleeve member 219 that is fitted by spigot joint between the hub member 210B and the shaft portion 221B. This eliminates the need to reduce radial clearance in the spline-fitting portion Esp between the hub portion 210B and the third sun gear 23s. That is, the hub member 210B need not be supported in the radial direction by the bottoms of the splines 214s of the projecting portion 214 and the tips of the splines of the third sun gear 23s (the larger diameter portions need not be slidingly fitted on each other). This can further improve ease of assembly of the hub member 210B and the third sun gear 23s in the clutch C2'.

The sleeve member 218 has the radial support surface 218a supporting the inner peripheral surface of the hub member 210B, and the axial support portion 218b projecting radially outward from the radial support surface 218a and supporting the hub member 210B (inner peripheral portion 213) in the axial direction. The position where the hub portion 210B is supported in the axial direction by the sleeve member 218 (the support point, near the outer periphery of the axial support portion 218b) can thus be located more radially outside than in the clutch C2 (near the inner periphery of the spacer 217). This can reduce moment that is applied to the hub member 210B when the clutch C2' is engaged, and can further reduce stress that is generated around the axial support portion 218b of the sleeve member 218 (around the round portion at the base end of the projecting portion 214).

The shaft portion 221B of the support member 220B has the recesses 221r extending in the axial direction, and the third sun gear 23s has the projections 23sp that are loosely fitted in the recesses 221r. No torque is thus allowed to be transmitted from the third sun gear 23s and the hub member 210B to the shaft portion 221B (support member 220B), and the shaft portion 221B can be prevented from rotating relative to the third sun gear 23s and the hub portion 210B. In the clutch C2', since no torque is transmitted between the third sun gear 23s and the shaft portion 221B, the projections 23sp need not be increased in size, and an increase in size of a portion around the shaft portion 23sa of the third sun gear 23s can be restrained.

As described above, a clutch of the present disclosure is a clutch (C2') including a friction plate (201), a separator plate (202), a clutch hub (200B), and a piston (240) that presses the friction plate (201) and the separator plate (202), in which the clutch hub (200B) includes a hub portion (210B) on which an inner peripheral portion of the friction plate or the separator plate (202) is fitted, a tubular shaft portion (221B) that movably supports the piston (240), and an engagement oil chamber defining portion (222) that together with the piston (240) defines an engagement oil chamber (250) to which an engagement oil pressure is supplied, the hub portion (210B) is spline-fitted on a gear (23s) of a planetary gear (25) so as to rotate with the gear (23s), and the shaft portion (221B) is rotatably supported by a central shaft (20i) and is fitted by spigot joint in the gear (23s).

The clutch hub of this clutch includes the hub portion on which the friction plate or the separator plate is fitted, the tubular shaft portion that movably supports the piston, and the engagement oil chamber defining portion that together with the piston defines the engagement oil chamber to which an engagement oil pressure is supplied. The hub portion is spline-fitted on the gear of the planetary gear so as to rotate with the gear, and the shaft portion is rotatably supported by the central shaft and is fitted by spigot joint in the gear. Since the hub portion of the clutch hub is a separate member from the gear of the planetary gear and is spline-fitted on the gear, machining accuracy of the gear of the planetary gear can be satisfactorily ensured, and the hub portion of the clutch hub and the gear of the planetary gear can be made to rotate together. Since the shaft portion of the clutch hub which is rotatably supported by the central shaft is fitted by spigot joint in the gear of the planetary gear, the gear can be accurately supported (aligned) by the shaft portion. As a result, in the clutch including the clutch hub that rotates with the gear of the planetary gear, machining accuracy and support accuracy of the gear can be satisfactorily ensured.

A spline-fitting portion (Esp) between the hub portion (210B) and the gear (23s) may be located radially outside a spigot-joint fitting portion (Ef) between the shaft portion (221B) and the gear (23s). This can further increase the torque radius of the spline-fitting portion between the hub portion and the gear, whereby the axial length of the spline-fitting portion can be reduced and an increase in axial length of the clutch can be restrained.

The clutch (C2') may further include: an annular sleeve member (218) that is fitted by spigot joint between the hub portion (210B) and the shaft portion (221B) to support the hub portion (210B) in a radial direction. Since the sleeve member that is fitted by spigot joint between the hub portion and the shaft portion supports the hub portion in the radial direction, radial clearance in the spline-fitting portion between the hub portion and the gear need not be reduced, and ease of assembly of the hub portion and the gear can further be improved.

The sleeve member (218) may have a radial support surface (218a) supporting an inner peripheral surface of the hub portion (210B), and an axial support portion (218b) projecting radially outward from the radial support surface (218a) and supporting the hub portion (210B) in an axial direction. Since the position (support point) where the hub portion is supported in the axial direction by the sleeve member can thus be located more radially outside, moment that is applied to the hub member when the clutch is engaged can be reduced, and stress that is generated around the axial support portion of the sleeve member can further be reduced.

The hub portion (210B) may have a tubular portion (211) on which the friction plate or the separator plate (220) is fitted, and an annular wall portion (212B) formed integrally with the tubular portion (211) so as to extend radially inward from one end of the tubular portion (211), an inner peripheral surface of the annular wall portion (212B) may be supported in the radial direction by the sleeve member (218), the annular wall portion (212B) may have a tubular projecting portion (214) located radially outside the inner peripheral surface and projecting to an opposite side from the tubular portion (211), and an inner peripheral portion of the projecting portion (214) may be spline-fitted on the gear (23s).

The shaft portion (221B) may have a recess (221r) that extends in the axial direction, and the gear (23s) may have a projection (23sp) that is loosely fitted in the recess (221r) of the shaft portion (221B). No torque is thus allowed to be transmitted from the gear and the hub portion to the shaft portion, and the shaft portion can be prevented from rotating relative to the gear and the hub portion.

The shaft portion (221B) and the engagement oil chamber defining portion (222) may be formed as a single-piece member. Since torque is substantially not transmitted from the gear to the shaft portion that is fitted by spigot joint in the gear of the planetary gear, forming the shaft portion and the engagement oil chamber defining portion as a single-piece member can reduce the size and weight of the shaft portion and the engagement oil chamber defining portion which are formed as a single-piece member, and can also improve durability thereof.

One of the piston (240) and the engagement oil chamber defining portion (222) may have at least one projection (241P) that projects toward the other, and the other of the piston (240) and the engagement oil chamber defining portion (222) may have a recess (222r) that engages with the projection (241p). The shaft portion and the engagement oil chamber defining portion which are formed as a single-piece member can thus prevent the piston from rotating relative to the hub portion.

The clutch (C2') may further include: a return spring (SP2) that is disposed between the piston (240) and the hub portion (210B) and that biases the piston (240) so as to separate the piston (240) from the friction plate (201) and the separator plate (202); and a movement restricting member (219) that is placed so as to adjoin the spigot-joint fitting portion (Ef) between the shaft portion (221B) and the gear (23s) in the axial direction and that restricts such movement of the hub portion (210B) relative to the shaft portion (221B) that the hub portion (210B) is separated from the engagement oil chamber defining portion (222). Axial movement of the hub portion relative to the shaft portion can thus be satisfactorily restricted.

The gear (23s) may be a sun gear of the planetary gear (25), the hub portion (210B) may be spline-fitted on a shaft portion (23sa) of the sun gear, and the shaft portion (23sa) may have a central hole (23sc) in which a distal end of the shaft portion (221B) of the clutch hub (200B) is fitted by spigot joint.

A speed change device of the present disclosure is a speed change device (20B) that includes the clutch and that shifts power transmitted to an input member (20i) to transmit the shifted power to an output member (20o), characterized by including: a Ravigneaux type planetary gear mechanism (25) having an input element (23c), a fixable element (24s), and a first output element (23r) and a second output element (23s); a first planetary gear (21) having a plurality of rotary elements (21s, 21c, 21r); a second planetary gear (22) having a plurality of rotary elements (22s, 22c, 22r) and placed closer to the Ravigneaux type planetary gear mechanism (25) than the first planetary gear (21) is; a first brake (B1) that connects the fixable element (24s) of the Ravigneaux type planetary gear mechanism (25) to a stationary member (11) to hold the fixable element (24s) stationary and disconnects the fixable element (24s) from the stationary member (11); a first clutch (C1) that connects and disconnects the first output element (23r) of the Ravigneaux type planetary gear mechanism (25) and at least one (21s, 22s) of the rotary elements of the first and second planetary gears (21, 22) to and from each other; and a second clutch (C2') that connects and disconnects the second output element (23s) of the Ravigneaux type planetary gear mechanism (25) and at least one (21s, 22s) of the rotary elements of the first and second planetary gears (21, 22) to and from each other. In the speed change device, when the fixable element (24s) is held stationary by the first brake (B1), the Ravigneaux type planetary gear mechanism (25) increases a speed of power transmitted to the input element (20i) so that a rotational speed of the second output element (23s) becomes higher than that of the first output element (23r), and transmits the resultant power to the first and second output elements (23r, 23s), and the clutch is the second clutch (C2'), the gear is the second output element (23s) of the Ravigneaux type planetary gear mechanism (25).

When the fixable element is held stationary by the brake, the Ravigneaux type planetary gear mechanism of this speed change device increases the speed of the power transmitted to the input element so that the rotational speed of the second output element that is an element to be connected by the clutch (second clutch) becomes higher than that of the first output element, and transmits the resultant power to the first and second output elements. Accordingly, by improving machining accuracy and support accuracy of the gear that is the second output element, noise and vibrations can be satisfactorily restrained from being produced while the speed change device is in operation.

The speed change device (20B) may further include: a third clutch (C3); a fourth clutch (C4); and a second brake (B2), the first planetary gear (21) may have a first sun gear (21s), a first carrier (21c), and a first ring gear (21r), the second planetary gear (22) may have a second sun gear (22s), a second carrier (22c), and a second ring gear (22r), the first sun gear (21s) of the first planetary gear (21) and the second sun gear (22s) of the second planetary gear (22) may be constantly coupled together, the first carrier (21c) of the first planetary gear (21) may be constantly coupled to the input member (20i) and the input element (23c) of the Ravigneaux type planetary gear mechanism (25), the second carrier (22c) of the second planetary gear (22) may be constantly coupled to the output member (20o), the first clutch (C1) may connect and disconnect the first output element (23r) of the Ravigneaux type planetary gear mechanism (25) and the first and second sun gears (21s, 22s) constantly coupled together to and from each other, the second clutch (C2') may connect and disconnect the second output element (23s) of the Ravigneaux type planetary gear mechanism (25) and the first and second sun gears (21s, 22s) constantly coupled together to and from each other, the third clutch (C3) may connect and disconnect the first output element (23r) of the Ravigneaux type planetary gear mechanism (25) and the second ring gear (22r) of the second planetary gear (22) to and from each other, the fourth clutch (C4) may connect and disconnect the first ring gear (21r) of the first planetary gear (21) and the second carrier (22c) of the second planetary gear (22) to and from each other, and the second brake (B2) may connect the second ring gear (22r) of the second planetary gear (22) to the stationary member (11) to hold the second ring gear (22r) stationary and may disconnect the second ring gear (22r) from the stationary member (11).

It should be understood that the disclosure of the present disclosure is not limited in any way to the above embodiments, and various modifications can be made without departing from the spirit and scope of the present disclosure. The above modes for carrying out the disclosure are merely shown as specific forms of the disclosure described in "SUMMARY" and are not intended to limit the elements of the disclosure described in "SUMMARY."

INDUSTRIAL APPLICABILITY

The disclosure of the present disclosure is applicable to the manufacturing field of clutches and speed change devices, etc.

The invention claimed is:
1. A clutch comprising:
a friction plate;
a separator plate;
a clutch hub; and
a piston that presses the friction plate and the separator plate, wherein
the clutch hub includes a hub member on which an inner peripheral portion of the friction plate or the separator plate is fitted, a tubular shaft that movably supports the piston, and an engagement oil chamber defining wall that together with the piston defines an engagement oil chamber to which an engagement oil pressure is supplied,
the hub member is spline-fitted on a gear of a planetary gear mechanism so as to rotate with the gear, and the tubular shaft is rotatably supported by a central shaft and the tubular shaft and the gear are formed together to form a spigot joint.

2. The clutch according to claim 1, wherein
splines located between the hub member and the gear are located radially outside of where the tubular shaft and the gear contact each other.

3. The clutch according to claim 2, further comprising:
an annular sleeve member that is fitted between the hub member and the tubular shaft to support the hub member in a radial direction.

4. The clutch according to claim 3, wherein
the annular sleeve member has a radial support surface supporting an inner peripheral surface of the hub member, and an axial support projecting radially outward from the radial support surface and supporting the hub member in an axial direction.

5. The clutch according to claim 4, wherein
the hub member has a tubular wall on which the friction plate or the separator plate is fitted, and an annular wall formed integrally with the tubular wall so as to extend radially inward from one end of the tubular wall,
the annular wall is supported in the radial direction by the annular sleeve member,
the annular wall has a tubular projecting wall located radially outside the annular sleeve member and projecting away from the tubular wall, and
an inner peripheral wall of the tubular projecting wall is spline-fitted on the gear.

6. The clutch according to claim 5, wherein
the tubular shaft has a recess that extends in the axial direction, and the gear has a projection that is loosely fitted in the recess of the tubular shaft to form the spigot joint.

7. The clutch according to claim 6, wherein
the tubular shaft and the engagement oil chamber defining wall are formed as a single-piece member.

8. The clutch according to claim 7, wherein
one of the piston and the engagement oil chamber defining wall has at least one projection that projects toward the other of the piston and the engagement oil chamber defining wall, and the other of the piston and the engagement oil chamber defining wall has a recess that engages with the projection.

9. The clutch according to claim 8, further comprising:
a return spring that is disposed between the piston and the hub member and that biases the piston so as to separate the piston from the friction plate and the separator plate; and
a movement restricting member that is placed so as to adjoin the spigot joint in the axial direction and that restricts such movement of the hub member relative to the tubular shaft such that the hub member is separated from the engagement oil chamber defining wall.

10. The clutch according to claim 9, wherein
the gear is a sun gear of the planetary gear mechanism,
the hub member is spline-fitted on a shaft of the sun gear, and
the shaft of the sun gear has a central hole in which a distal end of the tubular shaft of the clutch hub is fitted.

11. A speed change device that includes the clutch according to claim 10 and that shifts power transmitted to the central shaft to transmit the shifted power to an output, comprising:

the planetary gear mechanism that is a Ravigneaux type planetary gear mechanism having an input element, a fixable element, and a first output element and a second output element;
a first planetary gear mechanism having a plurality of rotary elements;
a second planetary gear mechanism having a plurality of rotary elements and placed closer to the Ravigneaux type planetary gear mechanism than the first planetary gear mechanism;
a first brake that connects the fixable element of the Ravigneaux type planetary gear mechanism to a stationary member to hold the fixable element stationary and disconnects the fixable element from the stationary member;
a first clutch that connects and disconnects the first output element of the Ravigneaux type planetary gear mechanism and at least one of the rotary elements of the first and second planetary gear mechanisms to and from each other; and
a second clutch that connects and disconnects the second output element of the Ravigneaux type planetary gear mechanism and at least one of the rotary elements of the first and second planetary gear mechanisms to and from each other, wherein
when the fixable element is held stationary by the first brake, the Ravigneaux type planetary gear mechanism increases a speed of power transmitted to the input element so that a rotational speed of the second output element becomes higher than that of the first output element, and transmits the resultant power to the first and second output elements, and
the clutch is the second clutch, and the gear is the second output element of the Ravigneaux type planetary gear mechanism.

12. The speed change device according to claim 11, further comprising:
a third clutch; a fourth clutch; and a second brake, wherein
the plurality of rotary elements of the first planetary gear mechanism includes a first sun gear, a first carrier, and a first ring gear,
the plurality of rotary elements of the second planetary gear mechanism includes a second sun gear, a second carrier, and a second ring gear,
the first sun gear of the first planetary gear mechanism and the second sun gear of the second planetary gear mechanism are constantly coupled together,
the first carrier of the first planetary gear mechanism is constantly coupled to the input and the input element of the Ravigneaux type planetary gear mechanism,
the second carrier of the second planetary gear mechanism is constantly coupled to the output,
the first clutch connects and disconnects the first output element of the Ravigneaux type planetary gear mechanism and the first and second sun gears constantly coupled together to and from each other,
the second clutch connects and disconnects the second output element of the Ravigneaux type planetary gear mechanism and the first and second sun gears constantly coupled together to and from each other,
the third clutch connects and disconnects the first output element of the Ravigneaux type planetary gear mechanism and the second ring gear of the second planetary gear mechanism to and from each other,
the fourth clutch connects and disconnects the first ring gear of the first planetary gear mechanism and the second carrier of the second planetary gear mechanism to and from each other, and the second brake connects the second ring gear of the second planetary gear mechanism to the stationary member to hold the second ring gear stationary and disconnects the second ring gear from the stationary member.

13. The clutch according to claim 1, further comprising:
an annular sleeve member that is fitted between the hub member and the tubular shaft to support the hub member in a radial direction.

14. The clutch according to claim 13, wherein
the annular sleeve member has a radial support surface supporting an inner peripheral surface of the hub member and an axial support projecting radially outward from the radial support surface and supporting the hub member in an axial direction.

15. The clutch according to claim 14, wherein
the hub member has a tubular wall on which the friction plate or the separator plate is fitted, and an annular wall formed integrally with the tubular wall so as to extend radially inward from one end of the tubular wall, the annular wall is supported in the radial direction by the annular sleeve member, the annular wall has a tubular projecting wall located radially outside the annular sleeve member and projecting away from the tubular wall, and an inner peripheral wall of the tubular projecting wall is spline-fitted on the gear.

16. The clutch according to claim 13, wherein
the hub member has a tubular wall on which the friction plate or the separator plate is fitted, and an annular wall formed integrally with the tubular wall so as to extend radially inward from one end of the tubular wall, an inner peripheral surface of the annular wall is supported in the radial direction by the annular sleeve member, the annular wall has a tubular projecting wall located radially outside the inner peripheral surface and projecting away from the tubular wall, and an inner peripheral wall of the tubular projecting wall is spline-fitted on the gear.

17. The clutch according to claim 1, wherein
the tubular shaft has a recess that extends in an axial direction, and the gear has a projection that is loosely fitted in the recess of the tubular shaft to form the spigot joint.

18. The clutch according to claim 1, wherein
the tubular shaft and the engagement oil chamber defining wall are formed as a single-piece member.

19. The clutch according to claim 1, wherein
one of the piston and the engagement oil chamber defining wall has at least one projection that projects toward the other of the piston and the engagement oil chamber defining wall, and the other of the piston and the engagement oil chamber defining wall has a recess that engages with the projection.

20. The clutch according to claim 1, further comprising:
a return spring that is disposed between the piston and the hub member and that biases the piston so as to separate the piston from the friction plate and the separator plate; and a movement restricting member that restricts such movement of the hub member relative to the tubular shaft such that the hub member is separated from the engagement oil chamber defining wall.

* * * * *